United States Patent
Benson et al.

(10) Patent No.: US 11,438,322 B2
(45) Date of Patent: Sep. 6, 2022

(54) MODIFYING SECURITY STATE WITH SECURED RANGE DETECTION

(71) Applicant: Apple Inc., Cupertino, CA (US)

(72) Inventors: Wade Benson, San Jose, CA (US); Marc J. Krochmal, Santa Clara, CA (US); Alexander R. Ledwith, Santa Cruz, CA (US); John Iarocci, Los Gatos, CA (US); Jerrold V. Hauck, Windermere, FL (US); Michael Brouwer, Los Gatos, CA (US); Mitchell D. Adler, Los Gatos, CA (US); Yannick L. Sierra, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/264,478

(22) Filed: Jan. 31, 2019

(65) Prior Publication Data
US 2019/0171465 A1    Jun. 6, 2019

Related U.S. Application Data

(62) Division of application No. 15/275,203, filed on Sep. 23, 2016.
(Continued)

(51) Int. Cl.
G06F 7/04         (2006.01)
G06F 17/30        (2006.01)
(Continued)

(52) U.S. Cl.
CPC .......... H04L 63/08 (2013.01); G06F 9/44505 (2013.01); H04L 9/085 (2013.01);
(Continued)

(58) Field of Classification Search
CPC ... H04L 63/08; H04L 63/107; H04L 63/1466; H04L 63/06; H04L 63/083; H04L 9/0822;
(Continued)

(56) References Cited

U.S. PATENT DOCUMENTS 6,539,479 B1    3/2003   Wu
6,981,144 B2    12/2005  Bauman
(Continued)

FOREIGN PATENT DOCUMENTS

CN    102184352    9/2011
CN    103378876    10/2013
(Continued)

OTHER PUBLICATIONS

International Search Report and Written Opinion from PCT/US2020/028549, dated Aug. 31, 2020, 18 pages.
(Continued)

*Primary Examiner* — Amie C. Lin
(74) *Attorney, Agent, or Firm* — BakerHostetler

(57) ABSTRACT

Some embodiments of the invention provide a method for a trusted (or originator) device to modify the security state of a target device (e.g., unlocking the device) based on a securing ranging operation (e.g., determining a distance, proximity, etc.). The method of some embodiments exchanges messages as a part of a ranging operation in order to determine whether the trusted and target devices are within a specified range of each other before allowing the trusted device to modify the security state of the target device. In some embodiments, the messages are derived by both devices based on a shared secret and are used to verify the source of ranging signals used for the ranging operation. In some embodiments, the method is performed using multiple different frequency bands.

20 Claims, 16 Drawing Sheets

Related U.S. Application Data

(60) Provisional application No. 62/349,029, filed on Jun. 12, 2016.

(51) Int. Cl.

| | |
|---|---|
| *H04L 9/40* | (2022.01) |
| *H04W 12/041* | (2021.01) |
| *H04W 12/086* | (2021.01) |
| *H04W 12/0431* | (2021.01) |
| *G06F 9/445* | (2018.01) |
| *H04W 12/06* | (2021.01) |
| *H04L 9/08* | (2006.01) |
| *H04L 9/14* | (2006.01) |
| *H04L 9/32* | (2006.01) |

(52) U.S. Cl.
CPC .......... *H04L 9/0822* (2013.01); *H04L 9/0894* (2013.01); *H04L 9/14* (2013.01); *H04L 9/3226* (2013.01); *H04L 63/0428* (2013.01); *H04L 63/06* (2013.01); *H04L 63/083* (2013.01); *H04L 63/107* (2013.01); *H04L 63/108* (2013.01); *H04L 63/1466* (2013.01); *H04W 12/041* (2021.01); *H04W 12/0431* (2021.01); *H04W 12/06* (2013.01); *H04W 12/086* (2021.01); *H04L 2209/80* (2013.01)

(58) Field of Classification Search
CPC ......... H04L 9/085; H04L 9/0894; H04L 9/14; H04L 9/3226; H04L 63/0428; H04L 63/108; H04L 2209/80; H04W 12/041; H04W 12/086; H04W 12/0431; H04W 12/06; H04W 12/04; H04W 12/08; G06F 9/44505
See application file for complete search history.

(56) References Cited

U.S. PATENT DOCUMENTS

| | | | |
|---|---|---|---|
| 7,515,048 | B1 | 4/2009 | Bhattiprolu |
| 9,001,905 | B2 | 4/2015 | Hamalaninen |
| 9,294,922 | B2 | 3/2016 | Garcia |
| 9,565,187 | B2 | 2/2017 | Daley |
| 9,684,394 | B2 | 6/2017 | Foss |
| 9,747,433 | B2 | 8/2017 | Patel |
| 10,097,353 | B1 | 10/2018 | Carlson |
| 10,296,754 | B2 | 5/2019 | Son |
| 10,701,067 | B1 | 6/2020 | Libo |
| 2003/0099362 | A1 | 5/2003 | Rollins |
| 2003/0220765 | A1 | 11/2003 | Overy et al. |
| 2004/0203600 | A1 | 10/2004 | McCorkle |
| 2005/0041813 | A1 | 2/2005 | Forest |
| 2005/0164634 | A1* | 7/2005 | Tanaka ................ H04L 63/18 455/41.2 |
| 2005/0251680 | A1 | 11/2005 | Brown |
| 2006/0288209 | A1 | 12/2006 | Vogler |
| 2007/0248232 | A1 | 10/2007 | Driscoll |
| 2007/0287386 | A1* | 12/2007 | Agrawal ................ H04L 67/24 455/67.11 |
| 2008/0201768 | A1 | 8/2008 | Koo |
| 2009/0288079 | A1 | 11/2009 | Zuber |
| 2009/0325573 | A1 | 12/2009 | Meyer |
| 2011/0093846 | A1 | 4/2011 | Moinzadeh |
| 2011/0215921 | A1 | 9/2011 | Ayed et al. |
| 2011/0265045 | A1 | 10/2011 | Hsieh |
| 2012/0240191 | A1* | 9/2012 | Husney ................ H04W 12/06 726/3 |
| 2012/0266221 | A1 | 10/2012 | Castelluccia et al. |
| 2013/0088192 | A1 | 4/2013 | Eaton |
| 2013/0335193 | A1 | 12/2013 | Hanson |
| 2013/0344812 | A1 | 12/2013 | Dees |
| 2014/0155031 | A1 | 6/2014 | Lee et al. |
| 2014/0199967 | A1 | 7/2014 | Varoglu |
| 2014/0208112 | A1 | 7/2014 | McDonald et al. |
| 2014/0282877 | A1 | 9/2014 | Mahaffey et al. |
| 2014/0298324 | A1 | 10/2014 | Voronkov |
| 2014/0310515 | A1 | 10/2014 | Kim et al. |
| 2014/0364085 | A1 | 12/2014 | Garcia |
| 2014/0364153 | A1 | 12/2014 | Ren |
| 2014/0373100 | A1 | 12/2014 | Poiesz |
| 2014/0376721 | A1 | 12/2014 | Perez et al. |
| 2015/0117340 | A1* | 4/2015 | Kawakami .............. G06F 21/74 370/329 |
| 2015/0147065 | A1 | 5/2015 | Civelli |
| 2015/0169335 | A1 | 6/2015 | Oh |
| 2015/0186636 | A1 | 7/2015 | Tharappel |
| 2015/0261947 | A1 | 9/2015 | Motoe |
| 2015/0266451 | A1 | 9/2015 | Oohara |
| 2015/0296074 | A1 | 10/2015 | Shah et al. |
| 2015/0382195 | A1 | 12/2015 | Grim |
| 2016/0058133 | A1 | 3/2016 | Fournier |
| 2016/0065374 | A1 | 3/2016 | Sauerwald |
| 2016/0080154 | A1 | 3/2016 | Lee et al. |
| 2016/0104006 | A1 | 4/2016 | Son |
| 2016/0119789 | A1 | 4/2016 | Hu et al. |
| 2016/0154952 | A1 | 6/2016 | Venkatraman |
| 2016/0164852 | A1* | 6/2016 | McCoy ................. H04L 9/3226 713/168 |
| 2016/0255662 | A1* | 9/2016 | Kotecha ................ H04W 76/10 370/254 |
| 2016/0277925 | A1 | 9/2016 | Bengtsson |
| 2016/0294817 | A1 | 10/2016 | Tan |
| 2017/0010771 | A1 | 1/2017 | Bernstein |
| 2017/0142578 | A1* | 5/2017 | Puri ..................... H04W 12/033 |
| 2017/0164190 | A1 | 6/2017 | Weksler |
| 2017/0270528 | A1 | 9/2017 | Prakash |
| 2017/0339151 | A1 | 11/2017 | Van Os |
| 2017/0357523 | A1 | 12/2017 | Benson et al. |
| 2017/0357788 | A1 | 12/2017 | Ledvina |
| 2017/0359169 | A1 | 12/2017 | Benson et al. |
| 2018/0276367 | A1 | 9/2018 | Benson |
| 2019/0312967 | A1 | 10/2019 | Sheng |
| 2020/0151304 | A1 | 5/2020 | Trueba |

FOREIGN PATENT DOCUMENTS

| | | |
|---|---|---|
| CN | 103442120 | 12/2013 |
| CN | 103841198 | 6/2014 |
| CN | 105164663 | 12/2015 |
| CN | 105245542 | 1/2016 |
| CN | 109196840 | 1/2019 |
| FR | 2882839 | 9/2006 |
| JP | 2005-117430 | 4/2005 |
| JP | 2007-019892 | 1/2007 |
| JP | 2009-065346 | 3/2009 |
| JP | 2009-533990 | 9/2009 |
| JP | 2014-123204 | 7/2014 |
| JP | 2016-054483 | 4/2016 |
| KR | 2010-0021531 | 2/2010 |
| KR | 2016-0057413 | 5/2016 |
| WO | WO 2017/218208 | 12/2017 |
| WO | WO 2019/067105 | 4/2019 |

OTHER PUBLICATIONS

Chinese Office Action from Chinese Patent Application No. 201780033185.8, dated Oct. 27, 2020, 26 pages including English language translation.
Japanese Office Action from Japanese Patent Application No. 2018-562555, dated Sep. 25, 2020, 5 pages including English language translation.
Notice of Acceptance from Australian Patent Application No. 2017286140, dated Oct. 12, 2020, 3 pages.
Korean Office Action from Korean Patent Application No. 2018-7034644, dated Nov. 26, 2020, 9 pages including English language translation.
European Office Action dated Mar. 2, 2020, from European Patent Application No. 17731348.3, 6 pages.
SRP Documentation, retrieved from http://srp.stanford.edu/doc.html#standards, visited Apr. 3, 2018, 3 pages.

(56) References Cited

OTHER PUBLICATIONS

Wu, "The Secure Remote Password Protocol," retrieved from http://srp.stanford.edu/ndss.html, 1998, 24 pages.
International Search Report and Written Opinion of International Patent Application PCT/US2017/035601, dated Oct. 18, 2017, 20 pages.
Written Opinion of the International Preliminary Examining Authority from PCT/US2017/035601, dated May 8, 2018, 8 pages.
Invitation to Pay Additional Fees from PCT/US2020/028549, dated Jul. 10, 2020, 13 pages.
European Office Action from European Patent Application No. 17731348.3, dated Sep. 12, 2019, 7 pages.
Australian Examination Report from Australian Patent Application No. 2017286140, dated Nov. 26, 2019, 4 pages.
Japanese Office Action from Japanese Patent Application No. 2018-562555, dated Jan. 6, 2020, 14 pages including English language translation.
Korean Office Action from Korean Patent Application No. 10-2018-7034644, dated Jan. 14, 2020, 10 pages including English language translation.
Japanese Notice of Allowance from Japanese Patent Application No. 2018-562555, dated May 31, 2021, 5 pages including English language translation.
Korean Notice of Allowance from Korean Patent Application No. 10-2018-7034644, dated May 31, 2021, 5 pages including English language translation.
European Office Action from European Patent Application No. 17731348.3, dated Jul. 2, 2021, 5 pages.
Australian Examination Report from Australian Patent Application No. 2021200451, dated Sep. 28, 2021, 3 pages.
Chinese Office Action from Chinese Patent Application No. 201780033185.8, dated Oct. 25, 2021, 19 pages including English language translation.
Chinese Office Action from Chinese Patent Application No. 202080028656.8, dated Jun. 9, 2022, 21 pages including machine-generated English language translation.

* cited by examiner

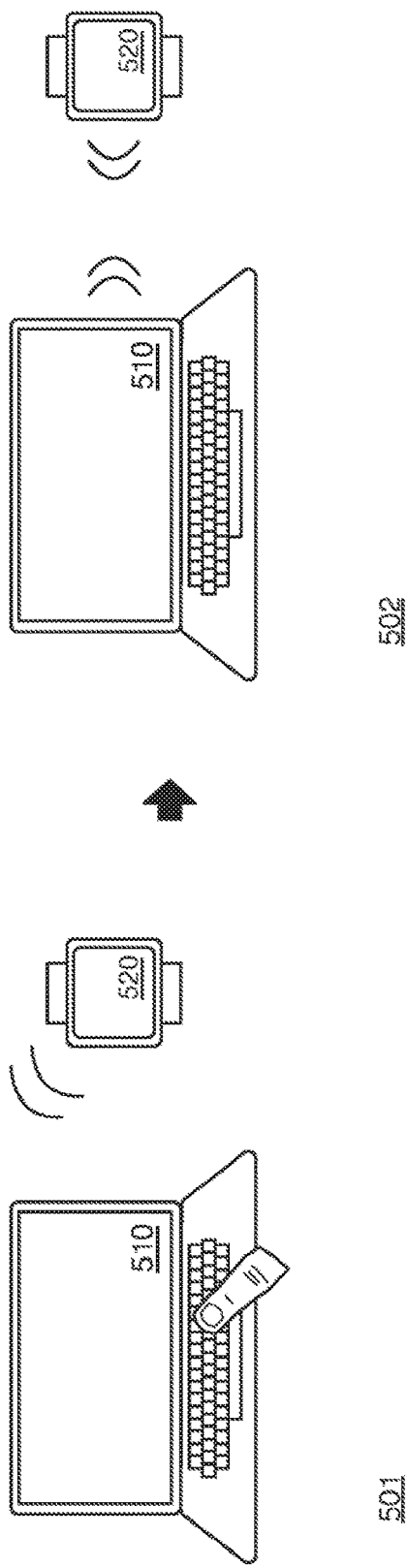
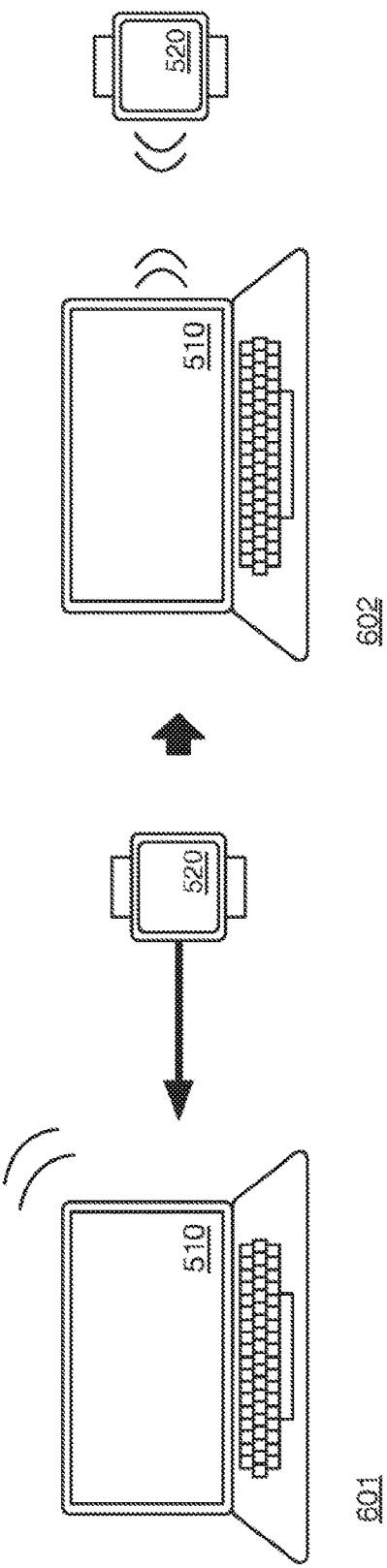
FIG. 5
FIG. 6

MODIFYING SECURITY STATE WITH SECURED RANGE DETECTION

CROSS-REFERENCE TO RELATED APPLICATIONS

The present application is a divisional of U.S. patent application Ser. No. 15/275,203, filed Sep. 23, 2016 and entitled "MODIFYING SECURITY STATE WITH SECURED RANGE DETECTION," which claims the benefit of priority of U.S. Provisional Patent Application No. 62/349,029, filed Jun. 12, 2016, the contents of each of which are hereby incorporated by reference in their entireties for all purposes.

BACKGROUND

In order to provide a balance of security and convenience, a trusted device (e.g., key fobs, mobile devices, wearable devices, etc.) may be used to unlock (or otherwise modify a security state) a target device. For example, a locked target device may automatically unlock in the presence of a trusted device, or may otherwise accept commands from the trusted device (e.g., via user input) to unlock the target device, allowing a user to avoid having to manually interact with the target device to unlock it.

Many such devices communicate with each other through various wireless protocols (e.g., Bluetooth, Wi-Fi, etc.) to verify the proximity of the target device before unlocking it. However, especially in the case of wireless protocols, the communications between the devices are susceptible to attackers who can capture the transmitted data and use it to spoof the proximity of a trusted device without having to break an encryption scheme that is commonly used for such communications.

For example, some devices or protocols use a received signal strength indicator (RSSI) to determine the proximity of a trusted device. A higher RSSI generally indicates that the trusted device is nearer to a particular location. However, an attacker can capture the transmission of the trusted device and amplify the signal to make it appear as though the devices are nearer to each other than they actually are, allowing the attacker to unlock the target device. It is desirable to provide more secure methods for detecting the range of a trusted device before allowing the trusted device to unlock a target device.

BRIEF SUMMARY

Some embodiments of the invention provide a method for using a trusted device to modify a security state at a target device (e.g., unlocking the device). The target device is the device to be unlocked, while the trusted device is a device that has been authorized to modify the security state of the target device.

The target and trusted devices (e.g., laptop computers, mobile phones, tablets, etc.) of some embodiments perform several ranging operations to compute sample distance measurements between the trusted and target devices. Once the sample distance measurements have been captured, the trusted device determines whether the sample distance measurements meet a particular set of criteria (e.g., whether the devices are within a threshold distance), and, when the calculated composite distance measurement meets the set of criteria, exchanges a security token (or other authorization information) with the target device to modify the security state (e.g., unlock, authorize payment data, etc.) at the target device. In some embodiments, modifying the security state includes authorizing a set of restricted operations or providing a higher level of security access at the target device.

In some embodiments, the trusted device is established as a trusted device through an authorization (or pairing) process with the target device. The authorization process allows a user to grant the trusted device permission to unlock (or otherwise modify the security state of) the target device. The trusted device of some embodiments receives a security token or other shared secret during the authorization process that can be used in future sessions to modify the security state of the target device.

Once the target device trusts the trusted device, the trusted device can be used to modify the security state of the target device. In some embodiments, the process for modifying the security state can be initiated by either the target device or the trusted device. The device that initiates the process (either the trusted or target device) is referred to as the initiating device, while the other device is the non-initiating device. The process of some embodiments can be explicitly initiated by a user (e.g., through input at the initiating device) or through implicit actions of the user (e.g., when a user carries a non-initiating device within a particular range of a non-initiating device).

In some embodiments, the non-initiating device (i.e., the device that is waiting for another device to initiate the process) continuously (or periodically) announces its availability, making the non-initiating device discoverable by other devices. When the initiating device determines that the security state of the target device should be modified (e.g., upon receiving user input), the initiating device performs a scan to discover the non-initiating device.

In some embodiments, a non-initiating device does not continuously announce its availability, but rather a proxy device is used to announce the availability of the non-initiating device. The initiating device of such embodiments scans for, and identifies the availability of the non-initiating device (through the announcements of the proxy device). The initiating device then sends a request to the proxy device. In some embodiments, the proxy device then sends another request to the non-initiating device to have it announce its own availability for a brief period of time. The initiating device then performs a scan to, discover the non-initiating device.

Once the initiating device discovers the announced availability of the non-initiating device, the initiating device exchanges ranging connection information with the non-initiating device. In some embodiments, the ranging connection information (e.g., device identifiers, device state, bootstrap information, etc.) is for establishing a ranging connection between the devices. In some embodiments, the ranging connection information identifies a portion of a frequency spectrum that the devices can use for the ranging connection. The ranging connection of some embodiments is used for performing ranging operations to determine whether the devices are within a threshold distance of each other.

In some embodiments, part of the security protocol for determining whether to allow a trusted device to unlock a target device is based on the set of ranging operations (e.g., determining a distance, proximity, etc.). The method of some embodiments uses ranging (e.g., distance, proximity, etc.) information to determine whether the trusted and target devices are within a specified range of each other before allowing the trusted device to unlock the target device. In some embodiments, the trusted device is a trusted device because it shares a shared secret (e.g., through a pairing operation), with the target device.

The shared secret of some embodiments is used to secure the ranging operation. In some embodiments, the shared secret is a highly secured key that is used for highly sensitive data stored in segregated and secured areas (e.g., a Secure Enclave Processor (SEP)) of the devices. In some embodiments, the method does not use the shared secret directly, but rather derives a derived key from the shared secret that can be used for the ranging operation.

The method of some embodiments shares the shared secret between the devices by performing a secure secret sharing operation over an unsecured connection. For example, the method of some embodiments uses a Diffie-Hellman exchange to provide for secure and ephemeral shared secrets between the devices. The shared secret of some embodiments is used to generate (e.g., through derivation functions) other shared secrets without having to send any of the secret data between the devices.

In other embodiments, the various shared values (e.g., shared secret, derived key, messages, etc.) are shared between the devices through a cloud service. The cloud service of some embodiments is associated with a user account that is associated with various devices. The cloud service of some embodiments is then used to share the different shared values for the associated devices.

In some embodiments, in order to determine the distance between a trusted device and a target device, the trusted device of some embodiments exchanges messages (or nonces) with the locked target device, recording timestamps for when the messages are sent and received at each device. In some embodiments, the messages that are exchanged between the devices are derived from the derived key (or the shared secret) using different key derivation functions (KDFs) that are used to generate new values. The KDFs of some embodiments are one-way functions that cannot be used to reveal the original value (i.e., the shared secret), which allow each device to independently generate the same messages without having to have previously sent the messages between the devices. In some embodiments, the messages are embedded into calibration signals that are sent through the air at a particular band of the frequency spectrum.

The devices then exchange the recorded timestamps for the messages. In some embodiments, the timestamps that are exchanged between the devices are encrypted using the derived key (derived from the shared secret), providing a high level of security for the timestamps without using the shared secret directly.

The devices of some embodiments then use the timestamps to calculate the distances between the devices, determining whether the devices are within a desired proximity of each other. For example, in some embodiments, the messages are sent through the air via radio waves which travel at the speed of light. The devices of some such embodiments calculate the distance between the two devices based on how long it takes for a message to travel between the devices (e.g., the time between the sending and receiving of the message) and the speed of light.

In some embodiments, in addition to verifying that the timestamps indicate that the devices are within the desired proximity, the method also performs other verification operations to prevent an attacker from spoofing the location of one or both devices. For example, in some embodiments, the method enforces a constraint on the time between the receipt of a first message at the target device and the sending of a second message from the target device. The constraint ensures that the time between the receipt of the first message and the sending of the second message is too short to allow an attacker to use replay attacks that take advantage of clock drift to make the devices appear to be closer together than they really are.

In some embodiments, the ranging operation is performed to gather several samples of the ranging data, allowing for a more precise and secure determination of the proximity of the devices. In some such embodiments, multiple distance measurement samples are statistically analyzed to generate a composite distance measurement, which is then compared to the threshold distance. Alternatively, or conjunctively, the devices analyze the distance measurement samples to calculate a confidence level that the device is within a threshold distance. When the confidence level exceeds a threshold value, the devices are deemed to be within an acceptable range.

When the method determines that the devices are within a desired proximity to each other (or that the ranging information cannot be verified), the method communicates (e.g., through a secured channel over an established connection) with the target device to unlock, or otherwise modify the security state of, the target device. In some embodiments, the method unlocks a target device by sending an unlock record (e.g., a secret or a key) that can be used to decrypt a master key at the target device. The unlock record of some embodiments is generated by the target device and sent to the trusted device during a process used for authorizing the trusted device to unlock the target device.

In some embodiments, the initial connection used for announcing and discovering the availability of a device, the ranging connection used for the ranging operations, and the connection used to communicate the unlock data are different and separate connections. For example, in some embodiments, the different connections use different protocols or different methods of communication. For example, in some embodiments, the data communicated across a particular connection is actually sent through a separate band of a frequency spectrum or network (e.g., the Internet).

In some embodiments, communications (e.g., requests, ranging information, etc.) are sent through secured channels over the different connections. The secured channels of some embodiments are encrypted using different cryptographic keys. Multiple different channels can each operate on different connections or may all operate on a single connection. Various references are made connections in this application, but it should be understood that communications over a connection may also be secured through a cryptographic channel.

The security of the invention of some embodiments requires that the messages are not predictable by an attacker trying to spoof the location of one or both of the devices. In some embodiments, the shared secret (and any values derived from the shared secret) are only used for a single ranging operation, so when the method of some embodiments determines that the devices are not within the desired proximity (or that the ranging information cannot be verified), the method discards the shared secret and any shared values (e.g., nonces, derived keys, etc.) and generates a new shared secret before beginning the process again.

In some embodiments, the method performs multiple stages of ranging operations. In addition to performing several ranging operations to generate an accurate distance measurement, the method of some embodiments performs a preliminary ranging operation using a first connection and performs the secure and precise ranging operation using a second connection. For example, in some embodiments the method is performed on a device with hardware that can communicate on multiple bands of a frequency spectrum. In some such, embodiments, it is desirable to use a lower-frequency band (e.g., due to power requirements, etc.) for a ranging operation. However, the lower-frequency band may not be able to provide the necessary precision or security required to determine whether the trusted device is near the target device. The method of some such embodiments then performs a first ranging operation using the lower-frequency band, and when the method determines that the devices are within the proximity of the lower-frequency band, the method, performs a second ranging operation using the high-frequency band to determine whether the devices are within the required range to unlock the target device. In some embodiments, the first ranging operation uses a different ranging operation from the second set of ranging operations.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description further describe the embodiments described in the Summary as well as other embodiments. Accordingly, to understand all the embodiments described by this document, a full review of the Summary, the Detailed Description, and the Drawings is needed. Moreover, the claimed subject matters are not to be limited by the illustrative details in the Summary, the Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIG. 5 illustrates an example of a target device that establishes a connection with a trusted device.

FIG. 6 illustrates an example of a trusted device that establishes a connection with a target device.

DETAILED DESCRIPTION

Figure 1:
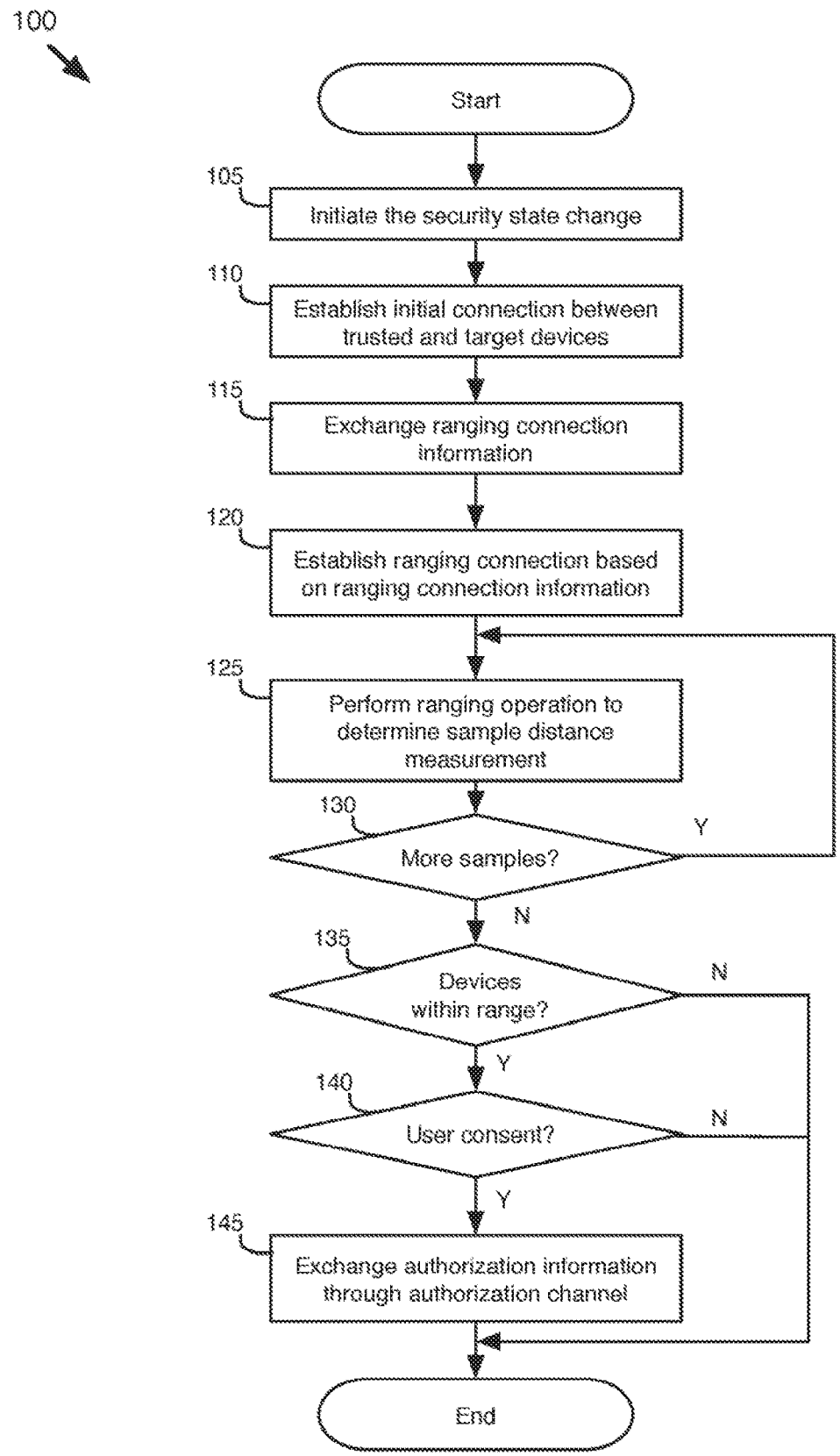
FIG. 1 conceptually illustrates a process for a trusted device to use secure ranging to modify a security state of a target device.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method for using a trusted device to modify a security state at a target device (e.g., unlocking the device). The target device is the device to be unlocked, while the trusted device is a device that has been authorized to modify the security state of the target device.

The target and trusted devices (e.g., laptop computers, mobile phones, tablets, etc.) of some embodiments perform several ranging operations to compute sample distance measurements between the trusted and target devices. Once the sample distance measurements have been captured, the trusted device determines whether the sample distance measurements meet a particular set of criteria (e.g., whether the devices are within a threshold distance), and, when the calculated composite distance measurement meets the set of criteria, exchanges a security token (or other authorization information) with the target device to modify the security state (e.g., unlock, authorize payment data, etc.) at the target device. In some embodiments, modifying the security state includes authorizing a set of restricted operations or providing a higher level of security access at the target device.

In some embodiments, the trusted device is established as a trusted device through an authorization (or pairing) process with the target device. The authorization process allows a user to grant the trusted device permission to unlock (or otherwise modify the security state of) the target device. The trusted device of some embodiments receives a security token or other shared secret during the authorization process that can be used in future sessions to modify the security state of the target device.

Once the target device trusts the trusted device, the trusted device can be used to modify the security state of the target device. In some embodiments, the process for modifying the security state can be initiated by either the target device or the trusted device. The device that initiates, the process (either the trusted or target device) is referred to as the initiating device, while the other device is the non-initiating device. The process of some embodiments can be explicitly initiated by a user (e.g., through input at the initiating device) or through implicit actions of the user (e.g., when a user carries a non-initiating device within a particular range of a non-initiating device).

In some embodiments, the non-initiating device (i.e., the device that is waiting for another device to initiate the process) continuously (or periodically) announces its availability, making the non-initiating device discoverable by other devices. When the initiating device determines that the security state of the target device should be modified (e.g., upon receiving user input), the initiating device performs a scan to discover the non-initiating device.

In some embodiments, a non-initiating device does not continuously announce its availability, but rather a proxy device is used to announce the availability of the non-initiating device. The initiating device of such embodiments scans for and identifies the availability of the non-initiating device (through the announcements of the proxy device). The initiating device then sends a request to the proxy device. In some embodiments, the proxy device then sends another request to the non initiating device to have it announce its own availability for a brief period of time. The initiating device then performs a scan to discover the non-initiating device.

Once the initiating device discovers the announced availability of the non-initiating device, the initiating device exchanges ranging connection information with the non-initiating device. In some embodiments, the ranging connection information (e.g., device identifiers, device state, bootstrap information, etc.) is for establishing a ranging connection between the devices. In some embodiments, the ranging connection information identifies a portion of a frequency spectrum that the devices can use for the ranging connection. The ranging connection of some embodiments is used for performing ranging operations to determine whether the devices are within a threshold distance of each other.

In some embodiments, part of the security protocol for determining whether to allow a trusted device to unlock a target device is based on the set of ranging operations (e.g., determining a distance, proximity, etc.). The method of some embodiments uses ranging (e.g., distance, proximity, etc.) information to determine whether the trusted and target devices are within a specified range of each other before allowing the trusted device to unlock the target device. In some embodiments, the trusted device is a trusted device because it shares a shared secret (e.g., through a pairing operation), with the target device.

The shared secret of some embodiments is used to secure the ranging operation. In some embodiments, the shared secret is a highly secured key that is used for highly sensitive data stored in segregated and secured areas (e.g., a Secure Enclave Processor (SEP)) of the devices. In some embodiments, the method does not use the shared secret directly, but rather derives a derived key from the shared secret that can be used for the ranging operation.

The method of some embodiments shares the shared secret between the devices by performing a secure secret sharing operation over an unsecured connection. For example, the method of some embodiments uses a Diffie-Hellman exchange to provide for secure and ephemeral shared secrets between the devices. The shared secret of some embodiments is used to generate (e.g., through derivation functions) other shared secrets without having to send any of the secret data between the devices.

In other embodiments, the various shared values (e.g., shared secret, derived key, messages, etc.) are shared between the devices through a cloud service. The cloud service of some embodiments is associated with a user account that is associated with various devices. The cloud service of some embodiments is then used to share the different shared values for the associated devices.

In some embodiments, in order to determine the distance between a trusted device and a target device, the trusted device of some embodiments exchanges messages (or nonces) with the locked target device, recording timestamps for when the messages are sent and received at each device. In some embodiments, the messages that are exchanged between the devices are derived from the derived key (or the shared secret) using different key derivation functions (KDFs) that are used to generate new values. The KDFs of some embodiments are one-way functions that cannot be used to reveal the original value (i.e., the shared secret), which allow each device to independently generate the same messages without having to have previously sent the messages between the devices. In some embodiments, the messages are embedded into calibration signals that are sent through the air at a particular band of the frequency spectrum.

The devices then exchange the recorded timestamps for the messages. In some embodiments, the timestamps that are exchanged between the devices are encrypted using the derived key (derived from the shared secret), providing a high level of security for the timestamps without using the shared secret directly.

The devices of some embodiments then use the timestamps to calculate the distances between the devices, determining whether the devices are within a desired proximity of each other. For example, in some embodiments, the messages are sent through the air via radio waves which travel at the speed of light. The devices of some such embodiments calculate the distance between the two devices based on how long it takes for a message to travel between the devices (e.g., the time between the sending and receiving of the message) and the speed of light.

In some embodiments, in addition to verifying that the timestamps indicate that the devices are within the desired proximity, the method also performs other verification operations to prevent an attacker from spoofing the location of one or both devices. For example, in some embodiments, the method enforces a constraint on the time between the receipt of a first message at the target device and the sending of a second message from the target device. The constraint ensures that the time between the receipt of the first message and the sending of the second message is too short to allow an attacker to use replay attacks that take advantage of clock drift to make the devices appear to be closer together than they really are.

In some embodiments, the ranging operation is performed to gather several samples of the ranging data, allowing for a more precise and secure determination of the proximity of the devices. In some such embodiments, multiple distance measurement samples are statistically analyzed to generate a composite distance measurement, which is then compared to the threshold distance. Alternatively, or conjunctively, the devices analyze the distance measurement samples to calculate a confidence level that the device is within a threshold distance. When the confidence level exceeds a threshold value, the devices are deemed to be within an acceptable range.

When the method determines that the devices are within a desired proximity to each other (or that the ranging information cannot be verified), the method communicates (e.g., through a secured channel over an established connection) with the target device to unlock, or otherwise modify the security state of, the target device. In some embodiments, the method unlocks a target device by sending an unlock record (e.g., a secret or a key) that can be used to decrypt a master key at the target device. The unlock record of some embodiments is generated by the target device and sent to the trusted device during a process used for authorizing the trusted device to unlock the target device.

In some embodiments, the initial connection used for announcing and discovering the availability of a device, the ranging connection used for the ranging operations, and the connection used to communicate the unlock data are different and separate connections. For example, in some embodiments, the different connections use different protocols or different methods of communication. For example, in some embodiments, the data communicated across a particular connection is actually sent through a separate band of a frequency spectrum or network (e.g., the Internet).

In some embodiments, communications (e.g., requests, ranging information, etc.) are sent through secured channels over the different connections. The secured channels of some embodiments are encrypted using different cryptographic keys. Multiple different channels can each operate on different connections or may all operate on a single connection. Various references are made connections in this application, but it should be understood that communications over a connection may also be secured through a cryptographic channel.

The security of the invention of some embodiments requires that the messages are not predictable by an attacker trying to spoof the location of one or both of the devices. In some embodiments, the shared secret (and any values derived from the shared secret) are only used for a single ranging operation, so when the method of some embodiments determines that, the devices are not within the desired proximity (or that the ranging information cannot be verified), the method discards the shared secret and any shared values (e.g., nonces, derived keys, etc.) and generates a new shared secret before beginning the process again.

In some embodiments, the method performs multiple stages of ranging operations. In addition to performing several ranging operations to generate an accurate distance measurement, the method of some embodiments performs a preliminary ranging operation using a first connection and performs the secure and precise ranging operation using a second connection. For example, in some embodiments the method is performed on a device, with hardware that can communicate on multiple bands of a frequency spectrum. In some such embodiments, it is desirable to use a lower-frequency band (e.g., due to power requirements, etc.) for a ranging operation. However, the lower-frequency band may not be able to provide the necessary precision or security required to determine whether the trusted device is near the target device. The method of some such embodiments then performs a first ranging operation using the lower-frequency band, and when the method determines that the devices are within the proximity of the lower-frequency band, the method performs a second ranging operation using the high-frequency band to determine whether the devices are within the required range to unlock the target device. In some embodiments, the first ranging operation uses a different ranging operation from the second set of ranging operations.

Many examples of the authorization, secure ranging, and unlocking are described below. Section I describes a method for providing secure ranging between a pair of devices. Section II describes establishing a ranging connection. Section III describes secure ranging process. Section IV describes an example of an electronic system that implements some embodiments, described herein.

I. Modifying Security State Using Secure Ranging

Some embodiments allow a user to modify the security state of a target device (e.g., unlocking) based on a relationship (e.g., proximity, paired devices, etc.) with a trusted device. FIG. 1 conceptually illustrates a process for a trusted device to use secure ranging to modify a security state of a target device. The process 100 of some embodiments is performed by one of the target (e.g., the device whose security state is to be, modified) and trusted (e.g., the device authorized to modify the security state) devices. In some embodiments, process 100 is initiated at a proxy device that assists the trusted and target devices to find each other. The initiating device (e.g., the target or trusted device) initiates the process 100 with a non-initiating device (e.g., the trusted or target device) to modify the security state of the target device.

In some embodiments, process 100 begins by initiating (at 105) the security state change for the target device. The initiation of the security state change of some embodiments is performed by the target device (i.e., the device that is to be unlocked), while in other embodiments, the state change is initiated by the trusted device. In some embodiments, the initiating device sends a request to the non-initiating device to initiate the security state change. In some embodiments, the security state change is initiated through explicit user interactions (e.g., keyboard input, voice commands, opening the lid of a laptop computer, etc.), while in other embodiments, the security state change is initiated through implicit interactions (e.g., moving, within a discoverable range, changing the state at the initiating device from locked to unlocked, etc.) between the target and trusted devices. The explicit user interactions of some embodiments require a user to authenticate themselves with the device (e.g., via a password, biometric data (e.g., Apple's TouchID)). In some embodiments, the initiation of the security state, change is initiated by other devices (e.g., location detection based on cameras and/or sensors), which communicate with the initiating device to begin the security state change.

After the process 100 initiates (at 105) the security state change, the process 100 establishes (at 110) an initial connection between the trusted and target devices. The initial connection of some embodiments uses a secure, standardized wireless protocol (e.g., Bluetooth) to discover the other device and establish the initial connection.

The process 100 of some embodiments uses the initial connection to exchange (at 115) ranging connection information (e.g., bootstrap information) used to set up a ranging connection (e.g., over WiFi) between the devices. At 120, the process 100 establishes a ranging connection between the trusted and target devices. In some embodiments, the ranging connection is a wireless channel that is used to exchange ranging information (e.g., through a series of ranging operations) in order to determine whether the target and trusted devices are within a particular range. The ranging connection of some embodiments is encrypted to protect the exchanged ranging information from potential attackers.

The process 100 performs (at 125) a ranging operation to capture a sample distance measurement between the trusted and target devices. In preferred embodiments, the process 100 uses several sample distance measurements to determine whether the devices are in range of each other, allowing for a more precise and secure determination of the proximity of the devices. At 130, the process 100 determines whether to capture more samples. When the process 100 determines (at 130) that more samples are needed, the process returns to step 110 to perform another ranging operation to capture another sample distance measurement.

In some embodiments, when the ranging operation is precise and secure enough, the process 100 only performs (at 125) a single ranging operation. For example, when the clocks of the trusted and target devices are synchronized, it may not be necessary to gather many samples. However, even in such cases, the capture of multiple samples may allow the devices to more precisely determine the distance between the devices. For example, in some embodiments, the use of multiple distance measurement samples can provide an accuracy of plus or minus a single meter.

When the process 100 determines (at 130) that no more samples are needed, the process 100 of some embodiments then performs a set of tests (e.g., as a part of a security protocol) to determine whether to authorize the change in security state of the target device. In some embodiments, the process 100 determines whether the devices are within range, whether one or both of the devices have received consent for the security state change, etc.

In this example, process 100 determines (at 135) whether the devices are within the desired range based on the captured sample distance measurements. In some embodiments, the multiple distance measurement samples are statistically analyzed to generate a composite distance measurement, which is then compared to the threshold distance. Alternatively, or conjunctively, the devices analyze the distance measurement samples to calculate a confidence level that the device is within a threshold distance. When the confidence level exceeds a threshold value, the devices are deemed to be within an acceptable range.

If a determination is made (at 135) that the devices are not within the desired range, the process ends. When the process 100 determines (at 135) that the devices are within the desired range, the process 100 determines (at 140) whether the user has indicated consent. For example, in some embodiments, process 100 provides a prompt for a user at one of the devices, requesting consent to modify the security state of the target device. User consent may be explicit (e.g., through direct user interaction) or implicit (e.g., trusted device is in an unlocked state). In some embodiments, the explicit consent requires simple approval (e.g., a response to a prompt), while in other embodiments the explicit consent requires authentication (e.g., passkey, biometric data (e.g., Apple's TouchID), etc.) of a user at a device.

In some preferred embodiments, such as when the initiation of the security state change is based on explicit input from the user (e.g., tapping at the target device), the initiation (at 105) of the security state change serves as consent for the initiating device. The process 100 then only determines (at 140) whether the user has indicated consent for the non-initiating device.

In some embodiments, process 100 determines (at 140) whether user consent is indicated for both the initiating device and the non-initiating device, after the ranging operations have completed. When explicit consent is required, determining consent after the ranging allows the security state change to seem more responsive as the ranging has already been completed before any user consent is requested.

However, when user consent is determined after the ranging operation and requires an explicit response from the user, it may be necessary to maintain a cached state for the ranging information (i.e., allowing the ranging decision to remain valid for a short window of time). In some embodiments, rather than checking for user consent after performing the ranging operations, process 100 checks for user consent before any of the ranging operations are performed. This allows the devices to avoid performing any unnecessary ranging operations.

Once the process 100 has determined (at 135 and 140) that the devices are within range and have obtained consent to exchange authorization information, the process 100 exchanges (at 145) the authorization information through a secured (e.g., encrypted) channel. The secured channel of some embodiments uses a highly-secured encryption key to encrypt communications in order to protect the authorization information. The authorization information (e.g., unlock information, security keys, payment data, etc.) is used to modify the security state at the target device. In some embodiments, the secured channel is established over the initial connection established at step 110. In other embodiments, the secured channel is established over a separate, different connection.

In some embodiments, the initial connection used for announcing and discovering the availability of a device, the ranging connection used for the ranging operations, and the connection used to communicate the authorization data are different and separate connections. For example, in some embodiments, the different connections use different protocols or different methods of communication (e.g., bands of a frequency spectrum, wireless protocols, etc.). For example, in some embodiments, the data communicated across a particular connection is actually sent through a separate band of a frequency spectrum or network (e.g., the Internet).

The different connections may provide different benefits. For example, in some embodiments, the initial connection uses a first wireless protocol to provide ease of discovery and reduced power requirements, while the ranging connection uses a second wireless protocol for the precision of the wireless frequency and security features.

Figure 2:
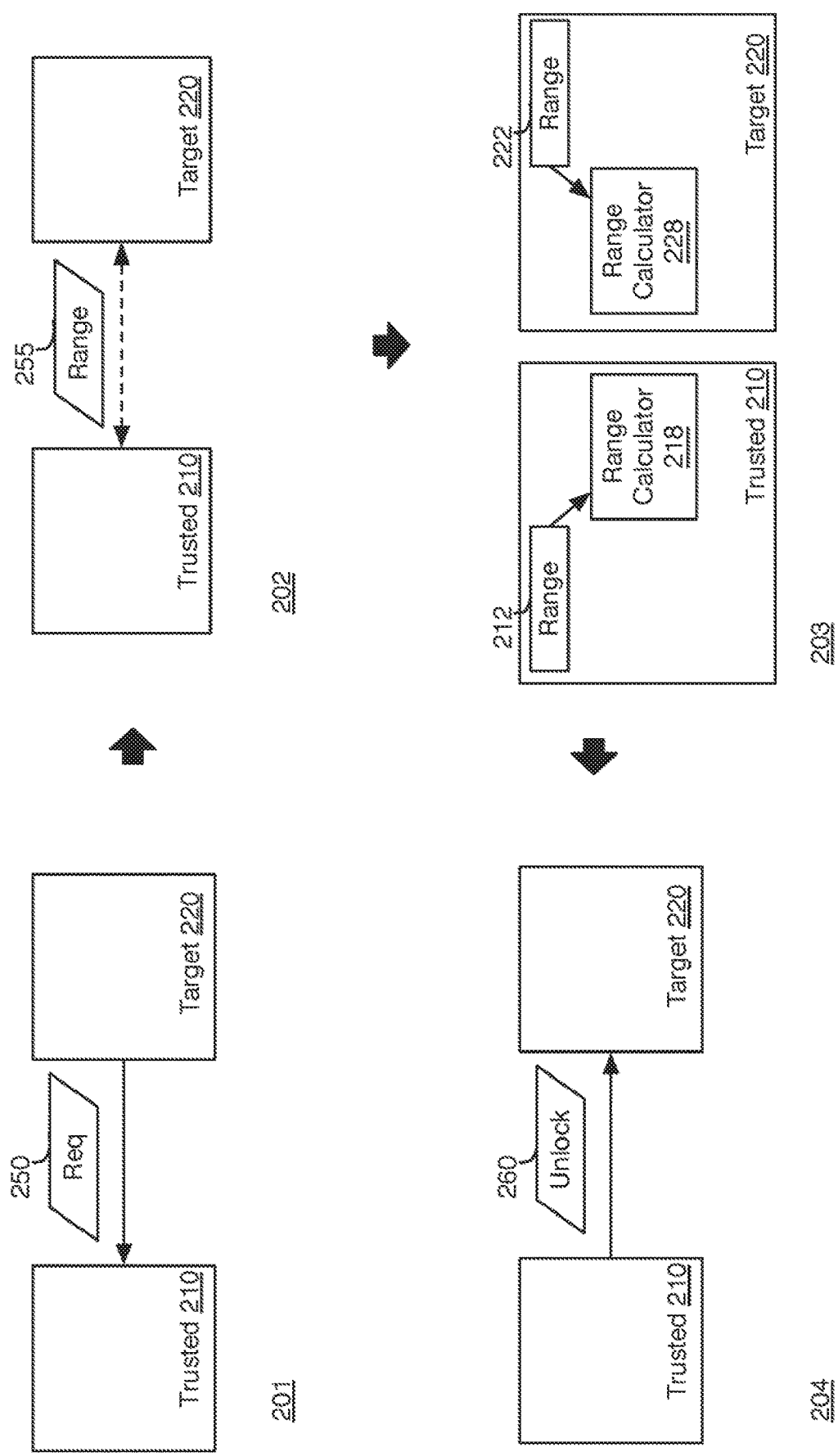
FIG. 2 illustrates an example of using secure ranging with a trusted device to modify the security state of a target device.

FIG. 2 illustrates an example of using secure ranging with a trusted device to modify the security state of a target device. The first stage 201 shows a trusted device 210 (e.g., a smart watch, wearable device, mobile phone, tablet, etc.) and a target device 220 (e.g., a laptop computer, mobile phone, tablet, etc.). The trusted device 210 of some embodiments is a device that is authorized to make changes in the security state of target device 220. In the first stage 201, target device 220 sends request 250 to the trusted device 210 over an initial connection (indicated with a solid line). The request 250 of some embodiments is sent when the user initiates the security process (either explicitly or implicitly) from the target device 220. In some embodiments, the request 250 includes bootstrap information to set up a ranging connection used for exchanging ranging information.

In the second stage 202, a ranging connection (depicted with a dashed line) has been set up between the trusted and target devices 210 and 220. The second stage 202 also shows that ranging information 255 is exchanged between the devices over the ranging connection. The ranging information 255 allows one or both of the devices 210 and 220 to compute the distance between the two devices. In some embodiments, the ranging information includes multiple sample distance measurements that are further analyzed to determine the distance between the two devices.

The third stage 203 shows that both the target device 220 and the trusted device 210 use range calculators 228 and 218 to analyze the exchanged ranging information 222 and 212. In some embodiments, the trusted and target devices determine whether to continue with the security state change operation based on the calculated ranges. The exchange of the ranging information 255 and the range calculations are described in further detail below in Section III.

The fourth stage 204 shows that the trusted device 210, after determining that the devices are within an acceptable range, sends unlock key 260. The unlock information 260 of some embodiments is used to unlock the target device 220. Various examples in this application are described with reference to an unlocking operation with an unlock key, but it should be understood by one skilled in the art that the novelty of the invention is not limited to such an unlocking operation. The unlocking operation may refer to any shift in security state at a target device, based on a relationship with a trusted device. In addition, although the authorization information is sometimes referred to as a key, the authorization information may include various different types of information. The authorization information of some embodiments is a key used to decrypt information (e.g., sensitive information, a master key, etc.) stored on the target device, while in other embodiments the authorization information is encrypted sensitive data (e.g., payment information, user data, etc.). This allows the sensitive information to only be stored on the trusted device and only provided to the target device when the trusted device is within range.

In some embodiments, rather than unlocking the device, the operation moves the target device from a high-level security state to a lower-level security state. In some cases, the target device remains locked during the shift, but the lower-level security state provides additional access to information on the target device. For example, in some embodiments, the target device provides minimal notifications on a lock screen (i.e., the displayed screen when the device is locked) in the higher-level security state, where any potentially sensitive information is hidden until the device is unlocked. By shifting to the lower-level security state (e.g., in the presence of a trusted device), the target device of some embodiments provides a user of the target device with access to more sensitive information for the notifications (e.g., text excerpts, senders, etc.).

In other embodiments, rather than providing additional information in a locked state, the different security states allow a trusted device to lower the security requirements for accessing the target device. For example, in some embodiments, a target device that normally requires an alphanumeric password can be configured to require a simpler pin code. In some embodiments, even when the target device is already unlocked, the trusted device and the security state shift are used to provide access to an application or to sensitive data within an application (e.g., browser histories, auto-fill data, credit card information, etc.) when the trusted device is within the particular range.

II. Establishing a Ranging Connection

In some embodiments, the shift in security state can be initiated by either the target device or the trusted device. In order to perform ranging operations to authenticate the devices, the shift of some embodiments begins by using an initial connection to establish a ranging connection. The initial connection of some embodiments is a secure, standardized wireless connection method (e.g., Bluetooth pairing) that is ubiquitous and efficient. The established initial connection is then used to exchange ranging connection information, which is used to establish a ranging connection.

In some embodiments, the ranging connection is used to exchange ranging information to determine whether the target and trusted devices are within a particular range.

Figure 3:
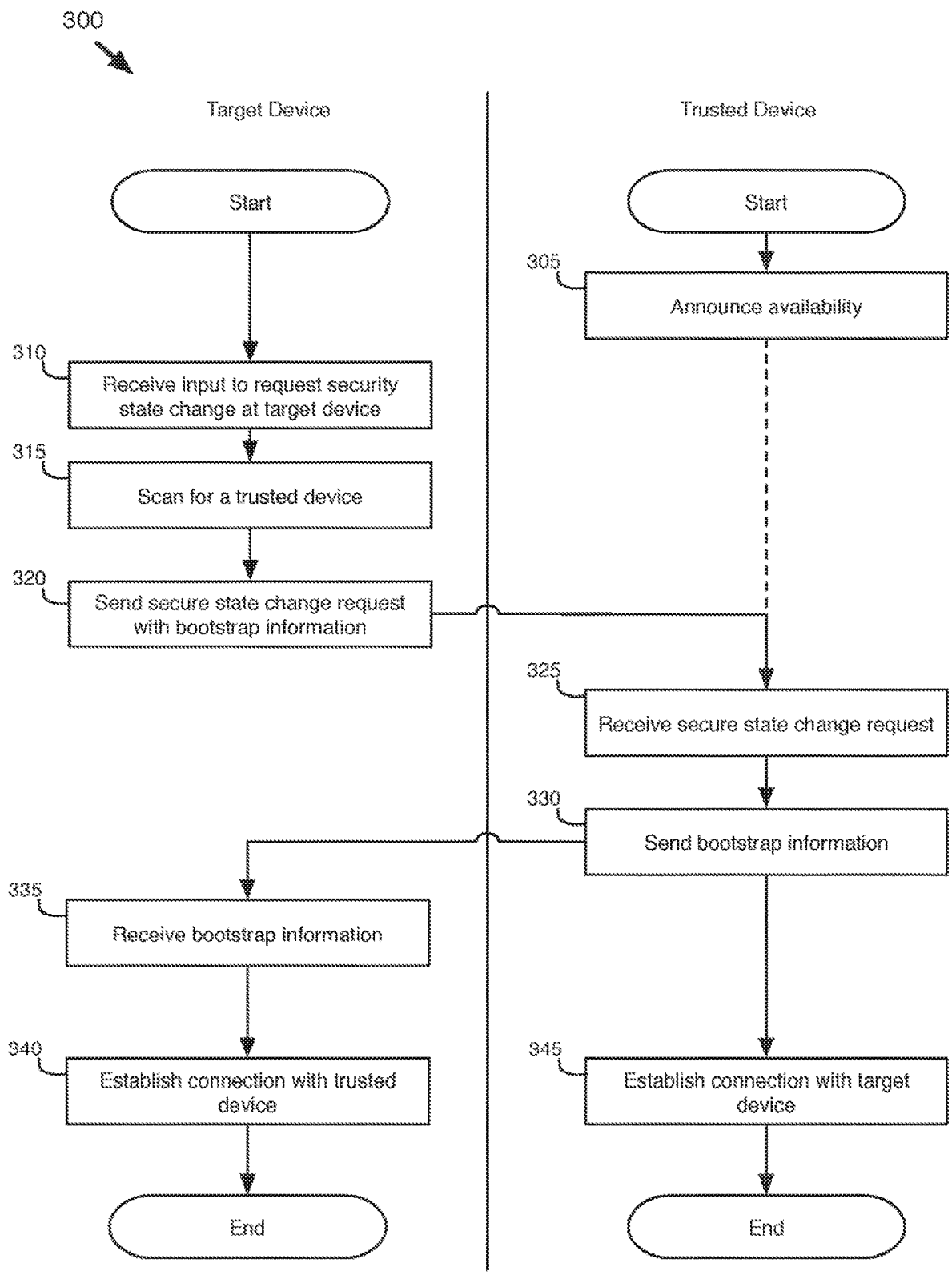
FIG. 3 conceptually illustrates a process for a target device that establishes a connection with a trusted device.

FIG. 3 conceptually illustrates a process for a target device that establishes a ranging connection with a trusted device. The process 300 begins with a trusted device that announces (at 305) its availability. The process 300 of some embodiments announce the availability of a device by broadcasting the trusted device's identifier, which allows the target device to determine whether it can modify the security state of the trusted device.

The target device then optionally receives (at 310) input (explicitly or implicitly) to request the security state change. As described above, in some embodiments, the request (or consent) for the security state change is not obtained until after the ranging connection is established and the ranging operation is completed.

The target device then scans (at 315) for the trusted device. Once the target device has identified the trusted device from the scan, it sends (at 320) a request for authorization information that allows the target device to modify its security state (e.g., unlock, change in security state, etc.). In some embodiments, the target device also sends (at 320) bootstrap information to set up the ranging connection for performing ranging operations between the target and trusted devices. The trusted device receives (at 325) the secure state change request along with the bootstrap information and sends, (at 330) bootstrap information back to the target device. In some embodiments, the bootstrap information includes state information (e.g., available bands of a wireless frequency spectrum) for each device.

At 335, the target device receives the bootstrap information of the trusted device. The target and trusted devices then establish (at 340 and 345) the ranging connection between the devices. The ranging connection is then used for the ranging process, as described in further detail below.

Figure 4:
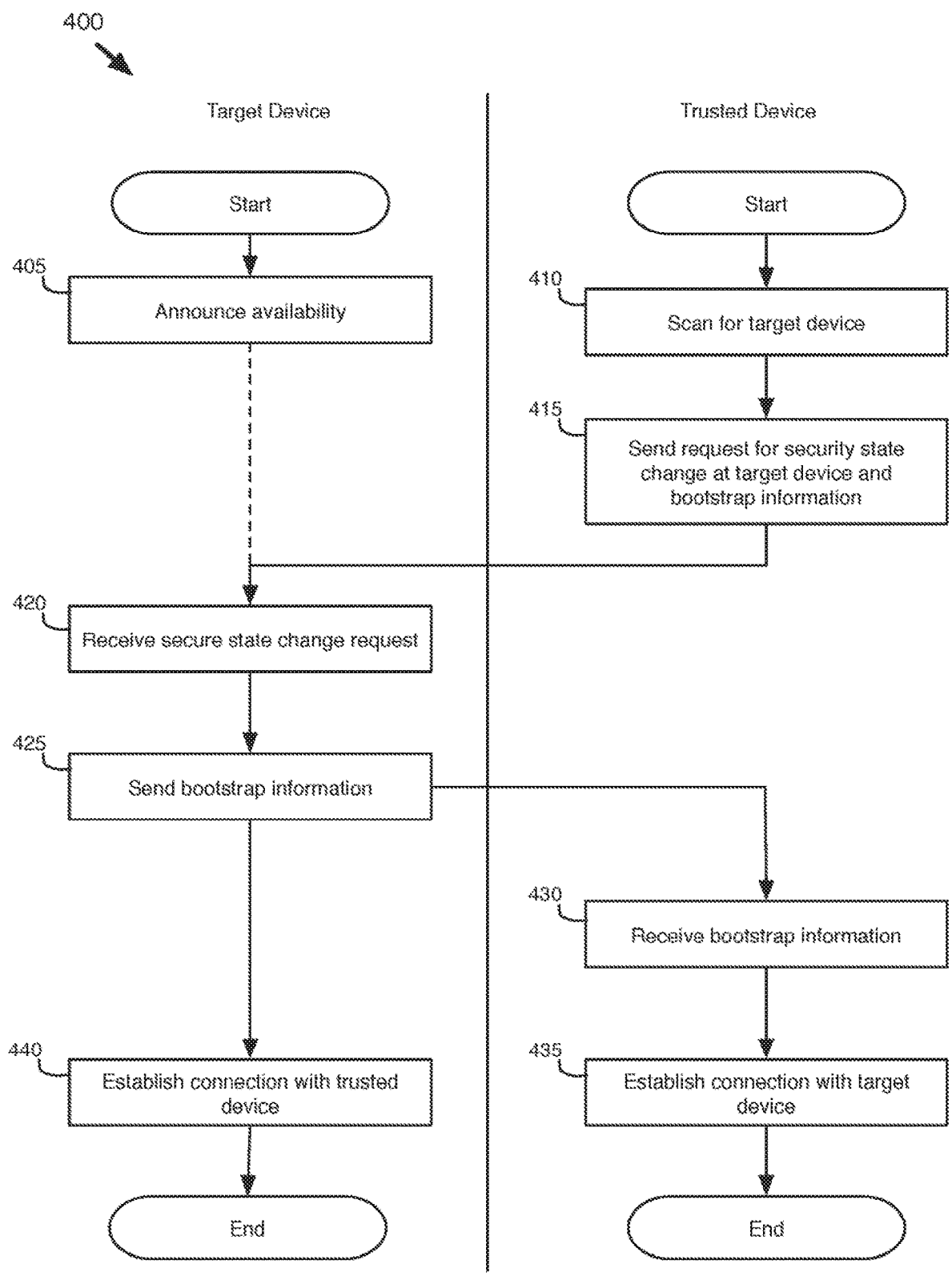
FIG. 4 conceptually illustrates a process for a trusted device that establishes a connection with a target device.

FIG. 4 conceptually illustrates a process for a trusted device that establishes a ranging connection with a target device. The process 400 begins with a target device that announces (at 405) its availability. The process 400 of some embodiments announce the availability of a device by broadcasting the target device's identifier, which allows the trusted device to determine whether it can modify the security state of the target device.

The trusted device then scans (at 410) for the target device. Once the trusted device has identified the target device from the scan, it sends (at 415) a request for a security state change (e.g., unlock, change in security levels, etc.) at the target device. In some embodiments, the trusted device also sends (at 415) bootstrap information to set up a ranging connection for performing ranging operations between the trusted and target devices. The target device receives (at 420) the secure state change request along with the bootstrap information and sends (at 425) bootstrap information back to the trusted device. In some embodiments, the bootstrap information includes state information (e.g., available bands of a wireless frequency spectrum) for each device.

At 430, the trusted device receives the bootstrap information of the target device. The trusted and target devices then establish (at 435 and 440) the ranging connection between the devices. The ranging connection is then used for the ranging process, as described in further detail below.

FIGS. 5 and 6 illustrate examples of initiating the ranging connection from the target and trusted devices respectively. FIG. 5 illustrates an example of a target device that establishes a connection with a trusted device in two stages 501 and 502. The first stage 501 shows a laptop computer 510

(i.e., target device) and a watch 520 (i.e., trusted device). In the first stage 501, the watch 520 is shown announcing its availability. The first stage 501 also shows that a user provides input (e.g., tapping a key, opening the lid of the laptop 510, etc.) to initiate a ranging process. The second stage 502 shows that the devices, have established (through processes such as those described above with reference to FIGS. 3 and 4) a wireless ranging connection.

FIG. 6 illustrates an example of a trusted device that establishes a ranging connection with a target device in two stages 601 and 602. The example of this figure shows the laptop computer 510 (i.e., target device) and watch 520 (i.e., trusted device) of FIG. 5. In this example, rather than the watch 520, the laptop computer 510 announces its availability. Also, rather than receiving input from a user, the watch 520 does not receive any input, but rather moves closer to the laptop computer 510. The second stage 602 shows that the wireless ranging connection has been established (through processes such as those described above with reference to FIGS. 3 and 4).

In some embodiments, continuously announcing the availability of a trusted device requires significant power from the trusted device. In some embodiments, the initial connection (and the announcing of the availability of the trusted device) are assisted using a proxy device, which may be more suited for continuously announcing the availability of the trusted device.

Figure 7:
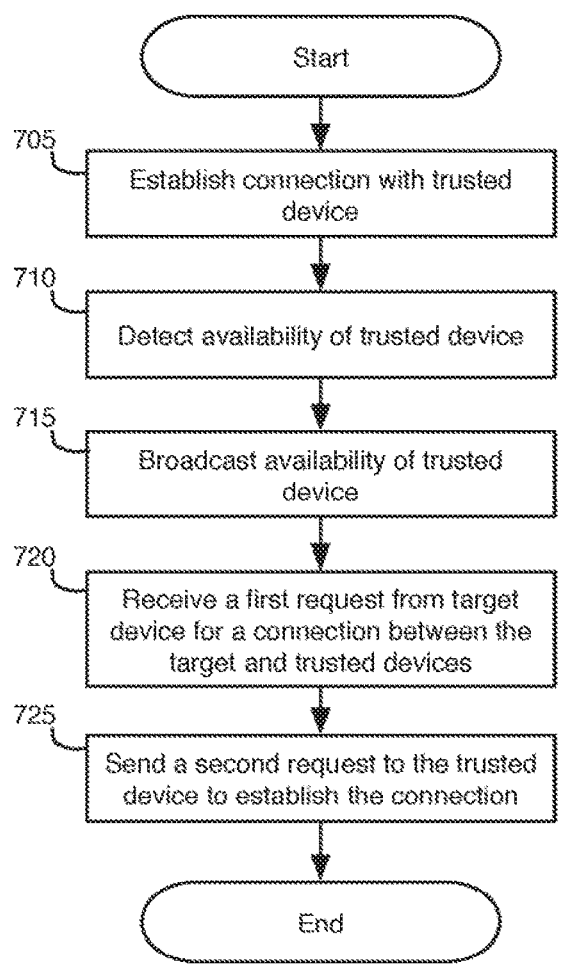
FIG. 7 conceptually illustrates a process for a proxy device that assists in establishing a connection between a target device and a trusted device.

FIG. 7 conceptually illustrates a process for a proxy device that assists in establishing the initial connection between a target device and a trusted device. The process 700 begins by establishing (at 705) a connection with the trusted device. This connection is different from the initial connection described in the examples above, as this connection is between the proxy device and the trusted device, while the initial connection is a connection between the trusted device and the target device. The process of this figure is used to prepare the target and trusted devices to set up the initial connection. The connection between the proxy device and the trusted device of some embodiments is a long-lived connection that is maintained for continuous communications between the devices. For example, in some embodiments, the connection is a Bluetooth connection (or channel) between a mobile phone and a watch, where the connection is maintained for communications between the devices for as long as the devices remain within range of each other.

The process 700 then detects (at 710) the availability of the trusted device. In some embodiments, the process 700 merely detects whether the connection with the device is still active, while in other embodiments, the process 700 detects additional information, such as a security state (e.g., locked, unlocked, authorized, etc.). Once the process 700 determines that the trusted device is available, the process 700 broadcasts (at 715) the availability of the trusted device so that a target device can identify the availability of the trusted device. The process 700 then receives (at 720) a first request from the target device for a connection between the target and trusted devices.

The process 700 then sends (at 725) a second request to the trusted device to establish the initial connection, as described above with reference to FIGS. 1 and 2. In some embodiments, second request is a request to have the trusted device begin broadcasting its own availability fora short period of time. In other embodiments, the proxy device forwards the first request (with or without any bootstrap information) to the trusted device. The trusted device of some such embodiments initiates the connection with the target device, either using the bootstrap information of the second request, or by broadcasting its own availability. Although this example describes the process for a proxy of a trusted device, it should be understood that a similar process would apply for a proxy of the target device.

Figure 8:
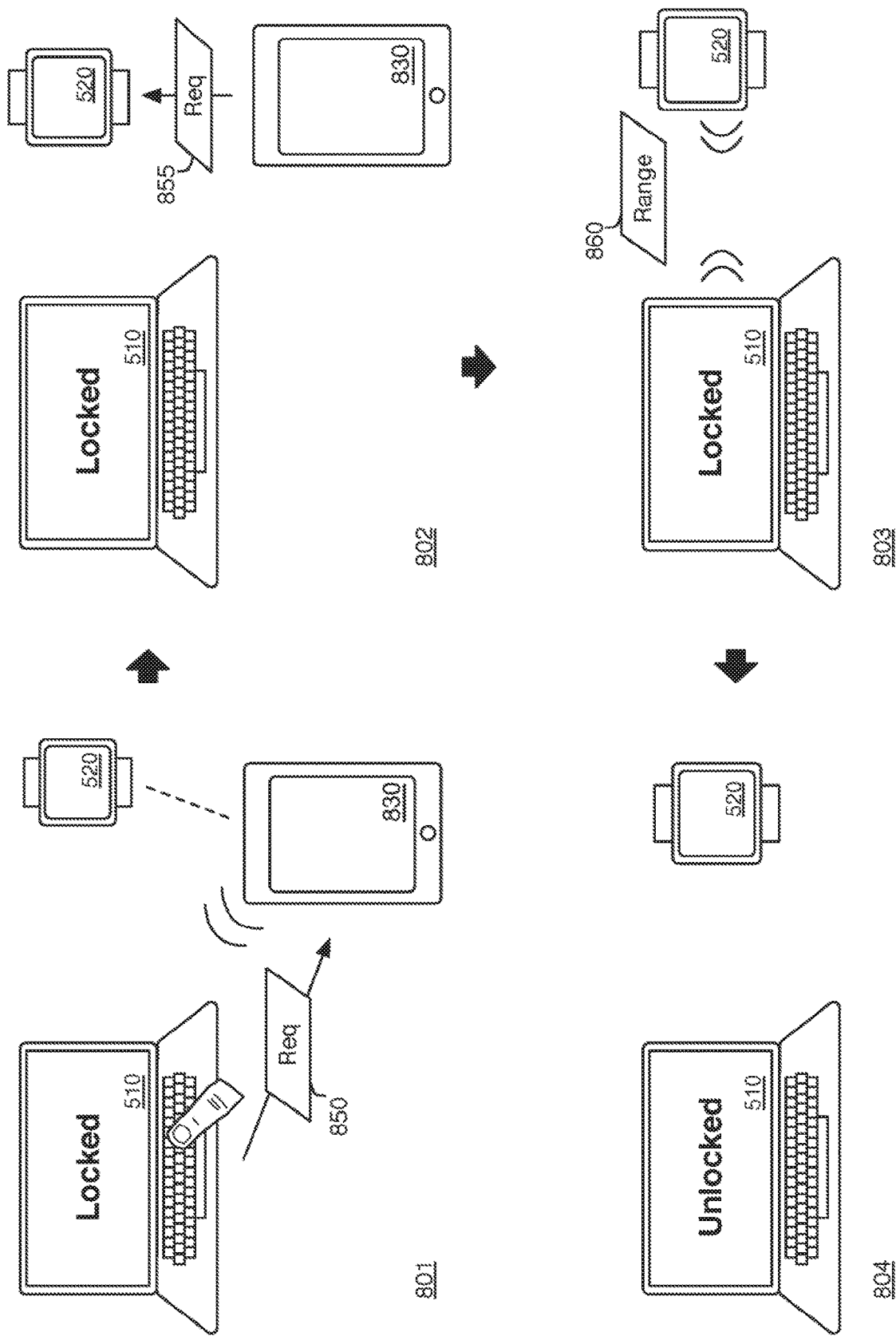
FIG. 8 illustrates an example of a proxy device that assists in establishing a connection between a target device and a trusted device.

FIG. 8 illustrates an example of a proxy device that assists in establishing a connection between a target device and a trusted device. The first stage 801 shows the target device 510 and trusted device 520 of FIG. 5. This example also shows a proxy device 830. In this example, the target device 510 is a laptop computer, the trusted device 520 is a watch, and the proxy device 830 is a mobile phone. The first stage 801 also shows that trusted device 520 and proxy device 830 maintain a connection (indicated by a dashed line). In this example, rather than the target or trusted devices announcing their availability, the proxy device 830 announces the availability of the trusted device 520.

The first stage 801 also shows that the user initiates the unlock operation, sending a request 850 to the proxy device 830. In the second stage 802, the proxy device 830 sends another request 855 to the device. In some embodiments, the request 855 is used to have the trusted device begin announcing its availability for a short period of time, while in other embodiments, the request 855 includes information that the trusted device needs to establish the ranging connection with the target device 510.

The third stage 803 shows that a ranging connection has been established between the target device 510 and the trusted device 520. The third stage 803 also shows that devices exchange range data 860 as part of a ranging process. The ranging process is described in further detail below with reference to FIGS. 9-12. Finally, in the fourth stage 804, the target device 510 determines that the trusted device 520 is within the acceptable range, and has been unlocked. A secure method for determining that the devices are with the acceptable range is described below.

III. Secure Range Determination

In some embodiments, the target and trusted devices use a secure ranging operation to determine whether the devices are within a desired range. The ranging operation needs to be secured to prevent an attacker from spoofing the devices to make them appear closer than they really are. The security protocols of some embodiments use messages to provide secure ranging information between a trusted device and a target device, allowing the devices to determine whether they are within a specified range of each other before allowing the trusted device to unlock the target device.

A. Secure Ranging

Figure 9:
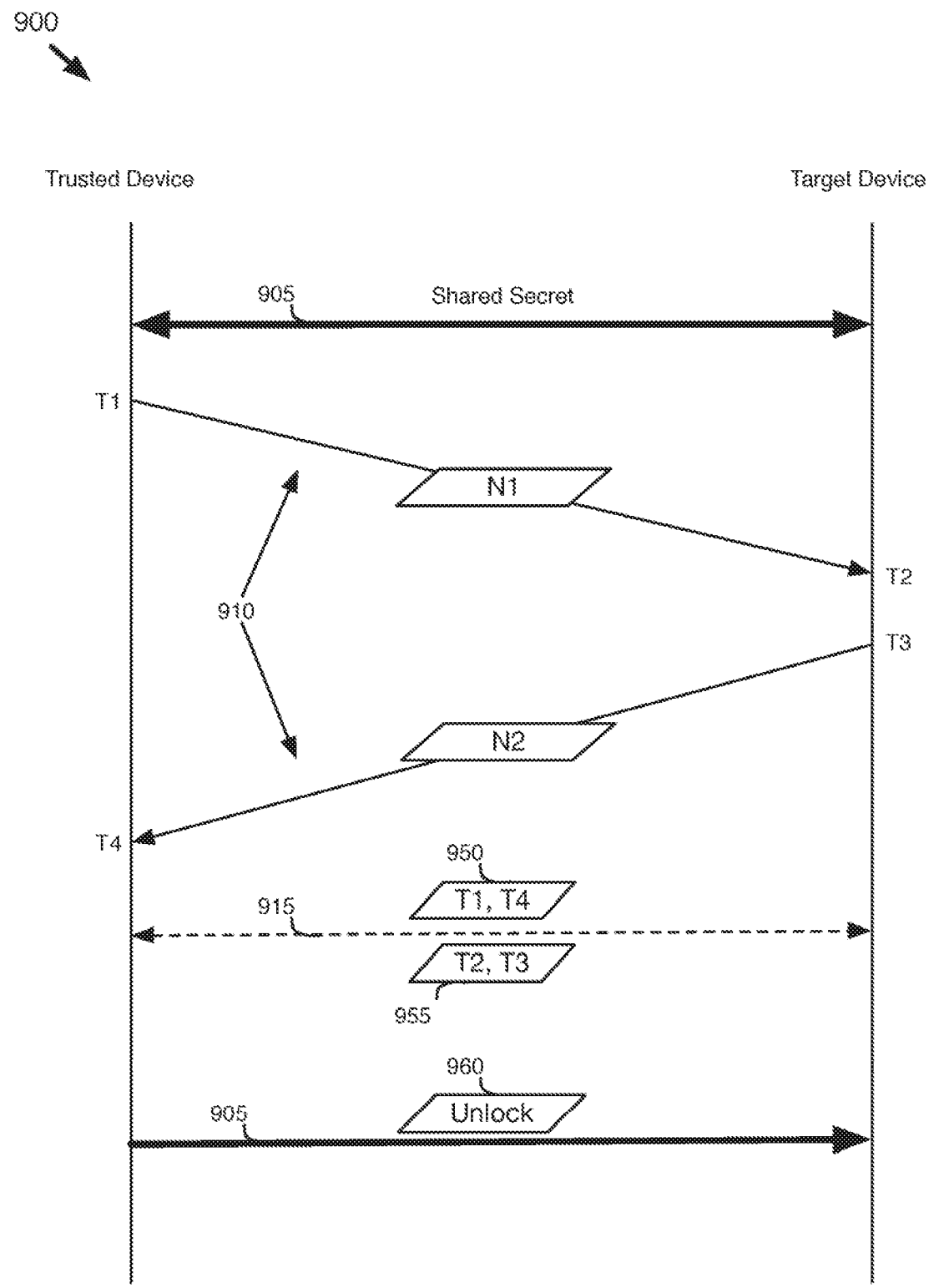
FIG. 9 illustrates a sequence diagram for providing secure ranging when unlocking a target device from a trusted device.

FIG. 9 illustrates a sequence diagram that describes an overview for providing secure ranging when unlocking a target device from a trusted device. A more in-depth description of the various elements and steps for providing secure ranging are described with reference to FIGS. 10-12. The sequence 900 of this figure illustrates a sequence of communications between a trusted device and a target device. The sequence 900 begins by establishing a shared secret channel 905 (e.g., encrypted using cryptographic keys) between the trusted device and the target device.

Once the shared secret channel 905 has been established, the sequence 900 shows that the trusted device sends a message (e.g., a nonce or other short-lived token) N1 to the target device. The target device processes N1, verifying that the value of N1 is the value that the target expected to receive from the trusted device. The target device may also decrypt the signal or perform other operations (e.g., Fourier transformations) on the received message. The target device then responds by sending a second different nonce, N2, back to the trusted device at time T3.

For the exchanges of the nonces, sequence 900 also shows the times at which the nonces N1 and N2 are sent and received. More specifically, nonce N1 is sent by the trusted device at time T1 and received by the target device at time T2. Nonce N2 is sent by the target device at time T3 and received by the trusted device at time T4. In some embodiments, the trusted and target devices record timestamps when the nonces N1 and N2 are sent and received by each device.

In some embodiments, a particular nonce is received at multiple times at the receiving device. This may occur when a wireless signal is reflected off of other surfaces or around obstructions. A signal may lose strength as it travels through an obstruction (e.g., a wall), while a reflected signal is largely unimpeded. In such a case, the strongest signal to a device is not necessarily the first signal that is received at the device. However, in order to get the most accurate determination of the proximity of a device, the receiving devices of some embodiments identify a timestamp for the first received signal, rather than the strongest signal.

The devices then exchange the timestamps recorded at each device in order to calculate the time of flight for the nonces N1 and N2 between the devices. The trusted device sends timestamps T1 and T4 to the target, while target sends timestamps T2 and T3 back to the trusted device. Although in this example the timestamps are exchanged in a single operation after the exchange of the nonces, some embodiments send the timestamps to the other device as soon as they are recorded. For example, in some embodiments, the target sends timestamp T2 back to the trusted device before sending nonce N2.

The trusted device and the target device then verify the exchanged timestamps to determine whether the devices are within a certain proximity of each other and whether the exchanged timestamps can be trusted. In some embodiments, only one of the devices performs the verification process. However, in preferred embodiments, both the trusted device and the target perform the verification process before allowing the target device to be unlocked.

Once the trusted device determines that the target device is within the required proximity, sequence 900 shows that trusted device sends an unlock message 960 to the target device over the shared secret channel 905. The unlock message 960 allows the target device to be unlocked.

In some embodiments, the unlock message 960 is a secret that is shared with the trusted device during a pairing operation or an authorization operation in which the trusted device is granted the authority to unlock the target device. In some such embodiments, the unlock message 960 of some embodiments is a key that was sent to the trusted device during the pairing operation by the target device. In some embodiments, the master key is derived by the target device from a passcode (or other authentication information) that is used to unlock the target device. The target device can build a token by encrypting the master key with the unlock message, so that when the trusted device returns the unlock message (after the secure ranging operation) to the target device, the target device can use the unlock message to decrypt the token to retrieve the master key and unlock the target device. Using a device to unlock another device is further described in U.S. patent application Ser. No. 14/810,395, entitled "Method of Using One Device to Unlock Another Device", filed on Jul. 27, 2015. U.S. patent application Ser. No. 14/810,395 is incorporated herein by reference.

In the sequence 900, various channels are shown (as bold, solid, and dashed lines) for transmitting the different types of ranging data (e.g., timestamps, nonces, unlock codes, etc.). In some embodiments, different channels may use a different cryptographic keys for encrypting communications on the channel, while some channels may use no key at all. In some embodiments, each of the channels operates over multiple different connections. In some embodiments, multiple different channels are used for the ranging process.

For example, the process of some embodiments uses the high-security shared secret channel 905 to communicate the unlock message 960, but uses a separate ranging channel 915 based on a key derived from the shared secret to communicate the timestamps for the different nonces. The ranging channel 915 of some embodiments is a secured channel established over the established ranging connections described above. In some embodiments, the unlock message 960 and the timestamps 950 and 955 are sent through the same channel.

The nonces in some embodiments are sent through the ranging channel 915 (i.e., encrypted with the derived key), while in other embodiments the nonces are sent unencrypted through the air through a particular connection 910 (e.g., a particular band of radio frequencies). In some embodiments, the particular connection 910 is a high-frequency connection that allows for a precise determination of the proximity of the devices.

Figure 10A:
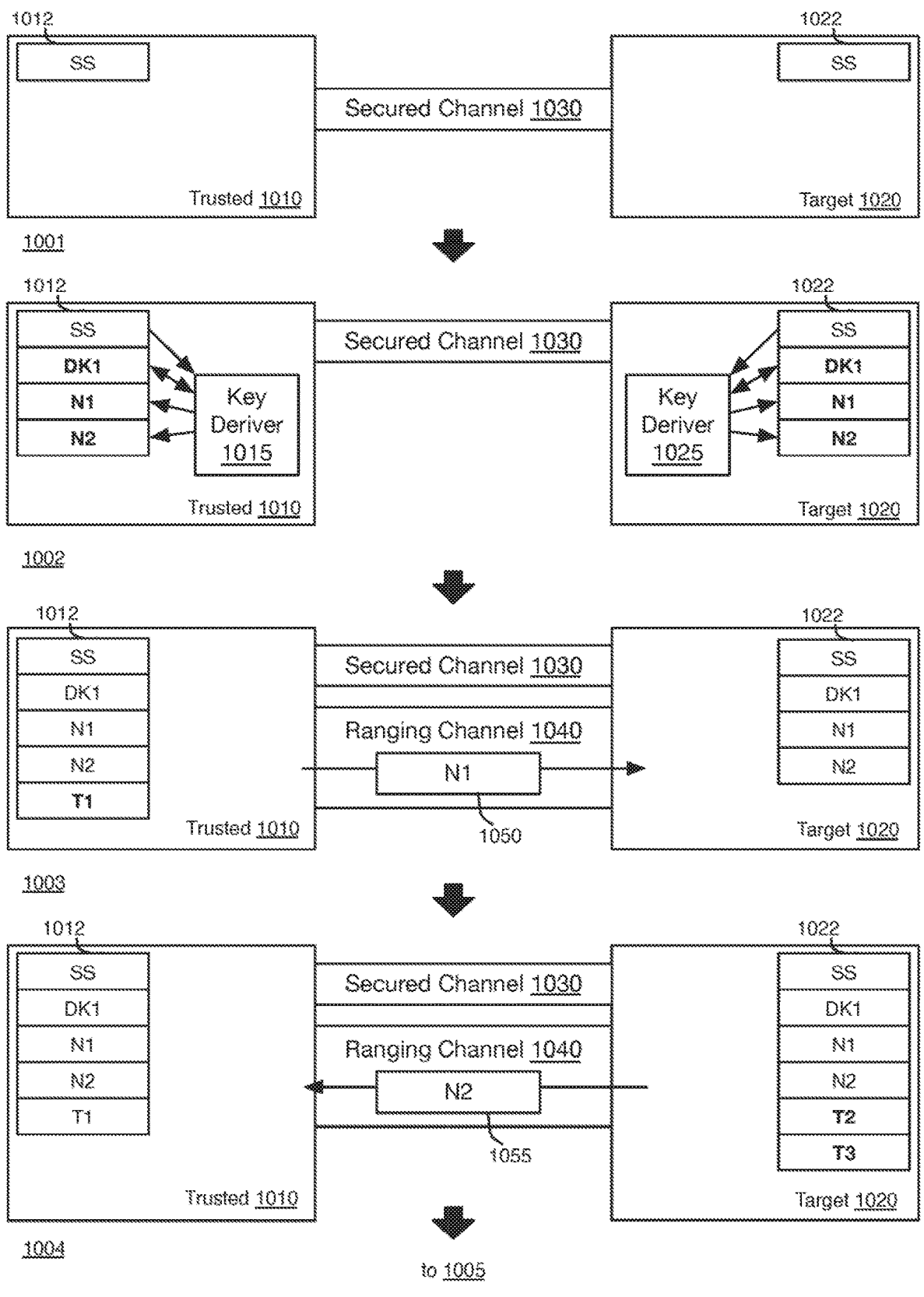
FIGS. 10A-B illustrates an example of providing secure ranging when unlocking a target device from a trusted device.
Figure 10B:
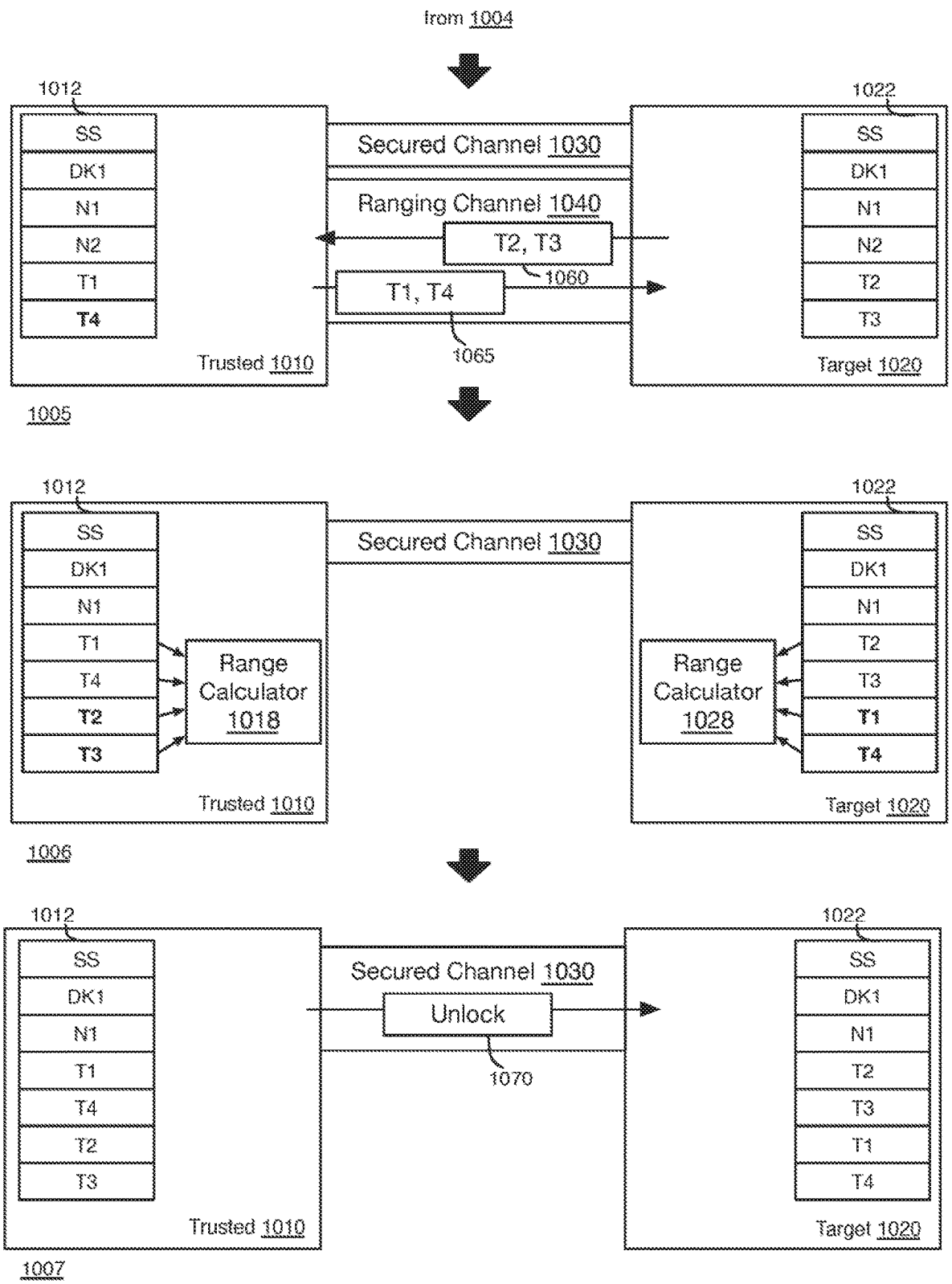

FIGS. 10A-B illustrates an example of providing secure ranging when unlocking (or otherwise modifying the security state of) a target device from a trusted device in seven stages 1001-1007. The first stage 1001 shows a trusted device 1010 and a target device 1020. The devices 1010 and 1020 are connected with a secured channel 1030. In this example, secured channel 1030 represents, communications between the devices that are encrypted with a shared secret SS that is shared between the devices.

In some embodiments, the shared secret is a highly secured system secret that is used to protect highly sensitive data that is communicated between the trusted devices 1010 and 1020. For example, some embodiments provide a secure enclave processor (SEP) within the processor architecture that provides heightened levels of security for the sensitive data in a segregated and secure area of the hardware and/or software of the devices. In order to maintain the security of the system secret, the ranging data used for the ranging operation of some embodiments does not use the shared secret directly (i.e., is not sent through secured channel 1030), but rather uses the shared secret to generate (e.g., through derivation functions) other shared values that is used for encrypting and verifying the sources of the ranging data.

In some embodiments, the shared secret for the secured channel 1030 is shared between the devices by performing a secure secret sharing operation over an unsecured channel. For example, the method of some embodiments uses a Diffie-Hellman exchange to provide for secure and ephemeral shared secrets between the devices. In other embodiments, the shared secret and/or the various shared values (e.g., shared secret, derived key, messages, etc.) are shared between the devices through a cloud service (e.g., iCloud). The cloud service of some embodiments is associated with a user account that is associated with various devices. The cloud service of some embodiments is then used to share the different shared values for the associated devices.

The second stage 1002 shows devices 1010 and 1020 with key derivers 1015 and 1025 respectively. The key derivers of some embodiments represents a module that, given a common input, generates another pseudo-random key or value (e.g., using a key derivation function). In some embodiments, the key derivers apply a one-way function to the input, which cannot be undone to reveal the original input.

In the second stage 1002, key derivers 1015 and 1025 each take the shared secret as input and generate a derived key DK1. Because key derivers 1015 and 1025 use the same derivation function at both devices 1010 and 1020, the same derived key DK1 is stored at both devices. In this manner, shared values can be generated at each of the devices without having to send them between the devices.

In some embodiments, in addition to the derived key, the key derivers 1015 and 1025 are used to derive nonces N1 and N2. In some embodiments, the key deriver only uses the shared secret for deriving the derived key, and any other values (e.g., the nonces) are then derived from the derived key DK1. In some embodiments, however, the nonces are derived directly from the shared secret SS. In order to ensure that the packets are not captured and replayed, some embodiments use different derivation functions to generate the different nonces. In this way, the nonces cannot be predicted by an attacker, so the attacker cannot generate a false ranging signal.

Nonces N1 and N2 of some embodiments are sent on a signal that is transmitted between the devices. In some embodiments, nonces N1 and N2 are used by the receiving device to verify that the sender of the nonce is a trusted partner for the communication. An attacker would not be able to independently generate nonces N1 and N2 without access to the high security shared secret. Although this example shows that the key derivers 1015 and 1025 derive the derived key DK1 and nonces N1 and N2 in a single step, the key derivers of some embodiments generate the derived key and nonces as they are needed (e.g., for encrypting, sending, verifying, etc.).

The third stage 1003 shows that the derived key DK1 is used to set up a ranging channel 1040. The ranging channel of some embodiments is used to send various data (e.g., nonces, timestamps, etc.) used for the ranging operation between the devices. Trusted device 1010 sends a nonce N1 to the target device 1020 through the ranging channel 1040. The trusted device 1010 also records a timestamp T1 at the time when the nonce N1 is sent.

In this example, the nonce is shown as being sent over the ranging channel (i.e., encrypted with the derived key DK1), however, in some embodiments the nonces are sent unencrypted through the air at a particular frequency that is set apart for communication between the devices. In some such embodiments, the signal is a calibration signal that is used to set up communication (direction, band, etc.) between the devices and the nonce (e.g., a 53-bit nonce) is encoded in a frequency shape that can be analyzed and decoded. The encoded signal represents an accumulation of sine waves which the receiver can analyze (e.g., using Fourier transforms) to retrieve the nonce as a binary output.

In the fourth stage 1004, target device 1020 has received and verified nonce N1 against the nonce N1 derived with key deriver 1025 and stored at memory 1012 of the target device 1020. In addition, target device 1020 records timestamps T2 and T3. Timestamp T2 marks the time when N1 is received at target device 1020, while timestamp T3 marks the time when N2 is sent from the target device 1020 to the trusted device 1010. In this example, nonce N2 was derived with nonce N1 and the derived key DK1, but in some embodiments, the nonce N2 is not derived until the nonce N1 received from the trusted device 1010 is verified.

The fifth stage 1005 shows that the devices 1010 and 1020 exchange the timestamps T1-T4 through the ranging channel 1040. Trusted device 1010 sends timestamps T1 and T4 (the times when N1 was sent and N2 was received) to, the target device 1020. Target device 1020 sends timestamps T2 and T3 (the times when nonce N1 was received and nonce N2 was sent) to the trusted device 1010.

The sixth stage 1006 shows that devices 1010 and 1020 use the timestamps T1-T4 to calculate the range or proximity of the devices to each other. The devices of some embodiments then use the timestamps to calculate the distances between the devices, determining whether the devices are within a desired proximity of each other. For example, in some embodiments, the messages are sent through the air via radio waves which travel at the speed of light. The devices of some such embodiments calculate the distance between the two devices based on how long it takes for a message to travel between the devices (e.g., the time between the sending and receiving of the message) and the speed of light. In some embodiments, the range calculator 1018 calculates the ranges for nonces N1 and N2 as:

$$\text{range}(N1)=(T2-T1)*c \text{ and,}$$

$$\text{range}(N2)=(T4-T3)*c, \text{ where } c \text{ is the speed of light}$$

In some embodiments, range calculator 1018 calculates the range of both nonces N1 and N2 and determines whether the other device is in range based on the minimum range value. In other embodiments, range calculator 1018 uses the maximum range value or an average range value when determining whether the devices are within a desired proximity. In some embodiments, the range calculator 1018 calculates the range based on the times measured at each device. For example, in some embodiments, the range calculator 1018 calculates the range between the devices as:

$$\text{range}=\frac{1}{2}((t4-t1)-(t3-t2))*c, \text{ where } c \text{ is the speed of light}$$

By employing such a ranging technique, a common time base is not required because (t4−t1) and (t3−t2) can be measured independently at each device using its own local time base. That is, the two clocks need not be synchronized.

In some implementations, a likelihood ratio (or, e.g., a log-likelihood ratio) test is employed. Such a test uses models for two possible cases of a distribution of ranges: one set of ranges that correspond to the device being unlocked, and one set of ranges that correspond to the device remaining locked. The likelihood ratio computes the ratio of the composite probabilities of being either inside or outside of a proximity based on an input set of ranges (e.g., the range measurements) and the modeled distributions. The ratio may then be compared to a threshold to determine the result of the unlock decision. In such implementations, the distance between the two devices may not be directly computed. As such, the threshold may not be presented in terms of a distance. Determining whether devices are within range based on wireless signals is further described in U.S. Provisional Patent Application 62/348,995, entitled "Unlocking a Device", filed on Jun. 12, 2016. U.S. Provisional Patent Application 62/348,995 is incorporated herein by reference.

In some embodiments, in addition to verifying that the timestamps indicate that the devices are within the desired proximity, the method also performs other verification operations to prevent an attacker from spoofing the location of one or both devices. For example, in some embodiments, the method enforces a constraint on the time between the receipt of a first message at the target device (T2) and the sending of a second message from the target device (T3). The constraint ensures that the time between the receipt of the first message and the sending of the second message is too short to allow an attacker to use replay attacks that take advantage of clock drift to make the devices appear to be closer together than they really are. In some embodiments, the constraint is a percentage of the required accuracy of the clock frequency for the communicated signals to be communicated between the devices.

Finally, the seventh stage 1007 shows that trusted device 1010 sends an unlock record 1070 through the secured channel 1030. The unlock record 1070 is a secret or a key that can be used to securely recover (e.g., decrypt) a master key at the target device. The master key of some embodiments is used by the target device 1020 to unlock other keys and secure data that can be used to unlock and provide access to the target device 1020. The unlock record 1070 of some embodiments is generated by the target device 1020 and sent to the trusted device 1010 during a pairing or authorization process used for authorizing the trusted device to unlock the target device.

Many of the examples described in this application make use of derived keys and nonces. Such derivations allow for a more secure and efficient process, but are not required for the invention. In some embodiments, the nonces are not derived from a key, but rather are shared by one of the devices with the other device. For example, in some embodiments, the nonces are shared through a cloud storage based on a common user account that is associated with both devices. In other embodiments, the nonces are shared between the devices over the secured channel, prior to the ranging operation. Similarly, the derived key for the ranging channel in the examples above does not have to be derived from the shared secret, but can be shared through other means (e.g., Diffie-Hellman) or may use no key at all.

Figure 11:
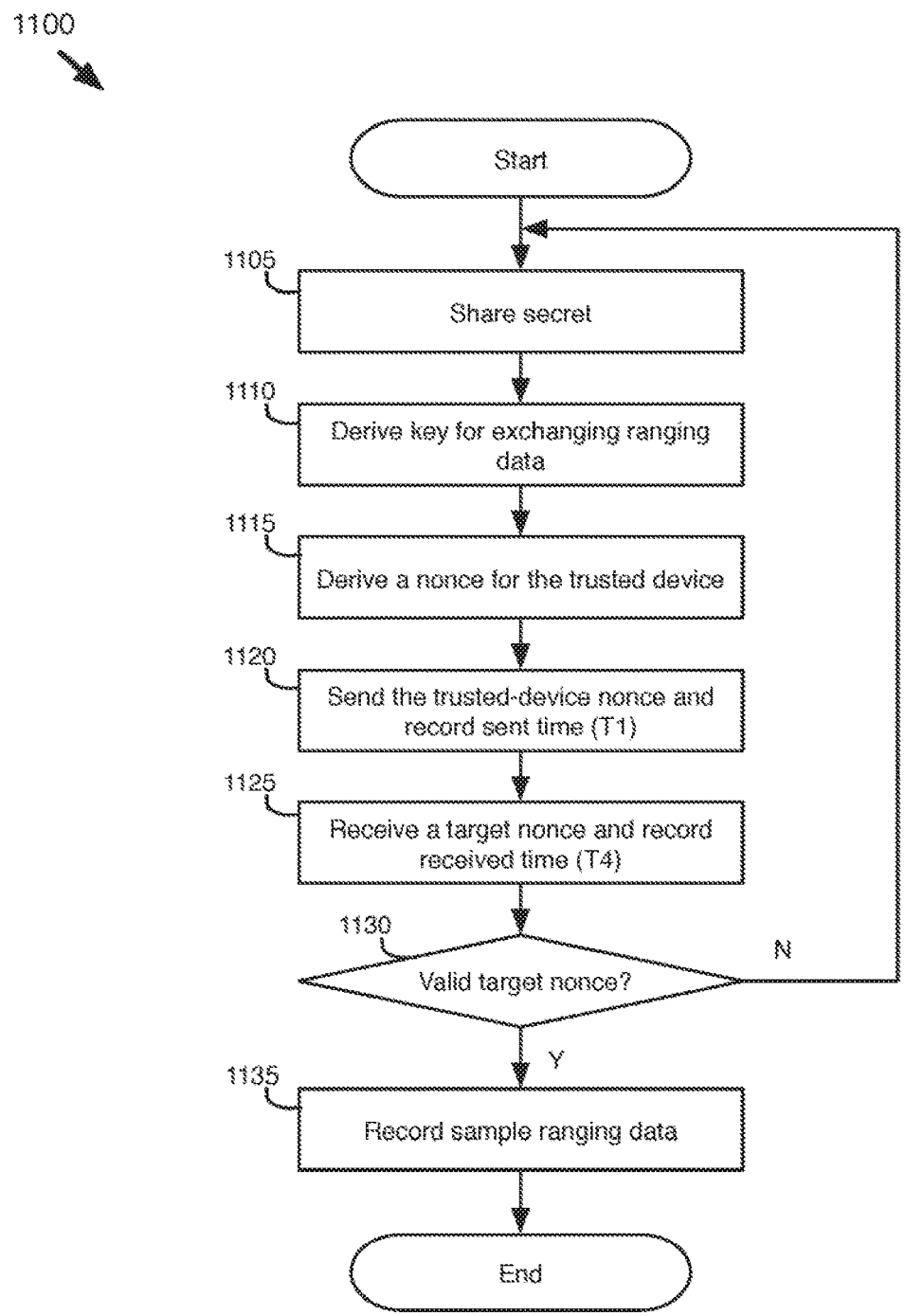
FIG. 11 conceptually illustrates a process for a trusted device that provides secure ranging to capture sample distance measurements.

FIG. 11 conceptually illustrates a process for a trusted device that provides secure ranging to capture sample distance measurements. The process 1100 of some embodiments is performed by a trusted device (e.g., a watch, a mobile phone, key fob, etc.) that is used to unlock another device (e.g., a laptop, a desktop computer, a tablet, etc.). In some embodiments, a particular device operates as both a trusted device for a first set of devices and as a target device for a second set of devices.

The process 1100 begins by sharing (at 1105) a shared secret. The process 1100 then derives (at 1110) a derived key for encrypting and exchanging ranging data. The ranging data of some embodiments includes the timestamps for when the different notices are sent, between the devices. Alternatively, or conjunctively, the ranging data of some embodiments includes a set of nonces that are sent with ranging signals between the devices to allow a receiving device to confirm the identity of the sender of a ranging signal.

The process 1100 then derives (at 1115) a nonce for the trusted device. The trusted-device nonce allows a target device to verify that the nonce came from the trusted device (e.g., because it has also generated the same nonce). The process 1100 then sends (at 1120) the trusted-device nonce to the target device and records the sent time (T1).

At 1125, the process 1100 receives a target nonce from the target device and records the received time (T4). The process 1100 then determines (at 1130) whether the target nonce is a valid target nonce. For example, in some embodiments, the process 1100 determines (at 1130) that the target nonce is valid when it matches a nonce generated at the trusted device (e.g., derived from a common derived key).

When the process 1100 determines (at 1130) that the target nonce is not valid, the process 1100 returns to step 1105 and shares (at 1105) a new secret to restart the ranging process. As it is important for a particular nonce to only be sent once, the process 1100 of some embodiments shares (at 1105) a new shared secret every time the ranging operation fails. While some embodiments may allow a shared secret to be used for more than one ranging operation, this can allow an attacker to capture the nonces and to replay them to trick a device into believing that the device is closer that it really is.

In some embodiments, the shared secret (and any values derived from the shared secret) are only used for a single ranging operation, so when the method of some embodiments determines that the devices are not within the desired proximity (or that the ranging information cannot be verified), the method discards the shared secret and any shared values (e.g., nonces, derived keys, etc.) and generates a new shared secret before beginning the process again. When the process 1100 determines (at 1130) that the target nonce is valid, the process 1100 records (at 1135) the sample distance measurement and ends.

Figure 12:
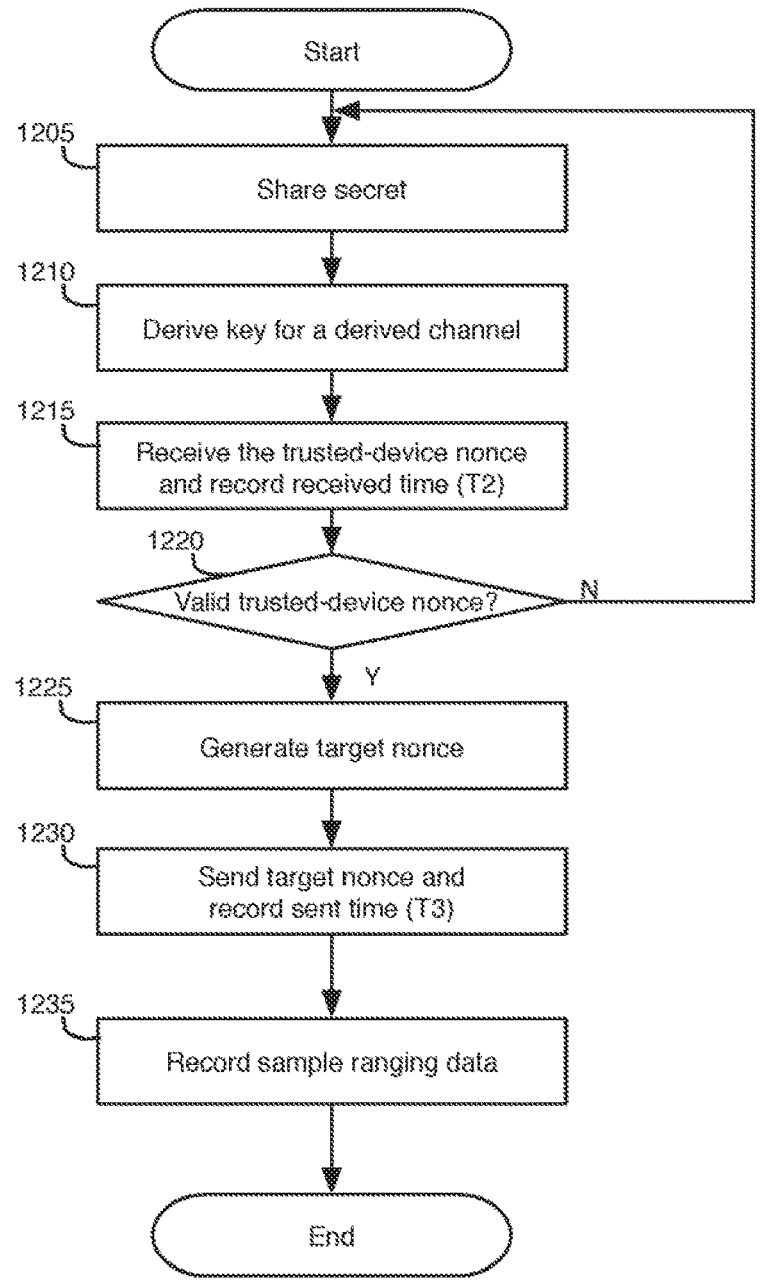
FIG. 12 conceptually illustrates a process for a target device that uses secure ranging with a trusted device to capture sample distance measurements.

FIG. 12 conceptually illustrates a process for a target device that uses secure ranging with a trusted device to capture sample, distance measurements. The process 1200 of some embodiments is performed by a target device when a trusted device (e.g., a watch, a mobile phone, key fob, etc.) is used to unlock the target device (e.g., a laptop, a desktop computer, a tablet, etc.). In some embodiments, a particular device operates as both a trusted device for a first set of devices and as a target device for a second set of devices.

The process 1200 begins by sharing (at 1205) a shared secret with the trusted device. The process 1200 then derives (at 1210) a derived key for encrypting and exchanging ranging data. The ranging data of some embodiments includes the timestamps for when the different nonces are sent between the devices. Alternatively, or conjunctively, the ranging data of some embodiments includes a set of nonces that are sent with ranging signals between the devices to allow a receiving device to confirm the identity of the sender of a ranging signal.

The process 1200 then receives (at 1215) a nonce from the trusted device and records the received time (T2). The trusted-device nonce allows the target device to verify that the nonce came from a trusted device (e.g., because it has also generated the same nonce). The process 1200 then determines (at 1220) whether the trusted-device nonce is valid. For example, in some embodiments, the process 1200 determines (at 1220) that the trusted-device nonce is valid when it matches a corresponding nonce generated at the trusted device (e.g., derived using a same derivation function from a common derived key).

When the process 1200 determines (at 1220) that the trusted-device nonce is not valid, the process 1200 returns to step 1205 and shares (at 1205) a new secret to restart the ranging process. As it is important for a particular nonce to only be sent once, the process 1200 of some embodiments shares (at 1205) a new shared secret every time the ranging operation fails. While some embodiments may allow a shared secret to be used for more than one ranging operation, this can allow an attacker to capture the nonces and to replay them to trick a device into believing, that the device is closer that it really is.

When the process 1200 determines (at 1220) that the trusted-device nonce is valid, the process 1200 generates (at

1225) a target nonce. The target nonce allows a trusted device to verify that the generated nonce came from the target device (e.g., because it has also generated the same nonce). At 1230, the process 1200 sends the generated target nonce to the trusted device and records the sent time (T3). The process 1200 then records (at 1235) the sample distance measurement. The process 1200 then ends.

In some embodiments, the process is repeated several times to collect multiple sample distance measurements. The processes 1100 and 1200 of some embodiments generates a new shared secret for each sample distance measurement, while in other embodiments, the same shared secret is used for all the sample distance measurements, but new keys and nonces are derived for each sample. The collected sample measurements are then used to determine whether the two devices are within the required range, as described below with reference to FIG. 15.

B. Dual Band Ranging

In some embodiments, the ranging operations are performed in a number of stages. For example, the devices of some embodiments have hardware that can communicate on multiple bands of a frequency spectrum. In some such embodiments, it is desirable to use a lower-frequency band (e.g., due to power requirements), but the lower-frequency band may not be able to provide the necessary precision required to determine whether the trusted device is near the target device. The different bands may provide different minimum threshold resolvable differences with different threshold distances.

Figure 13:
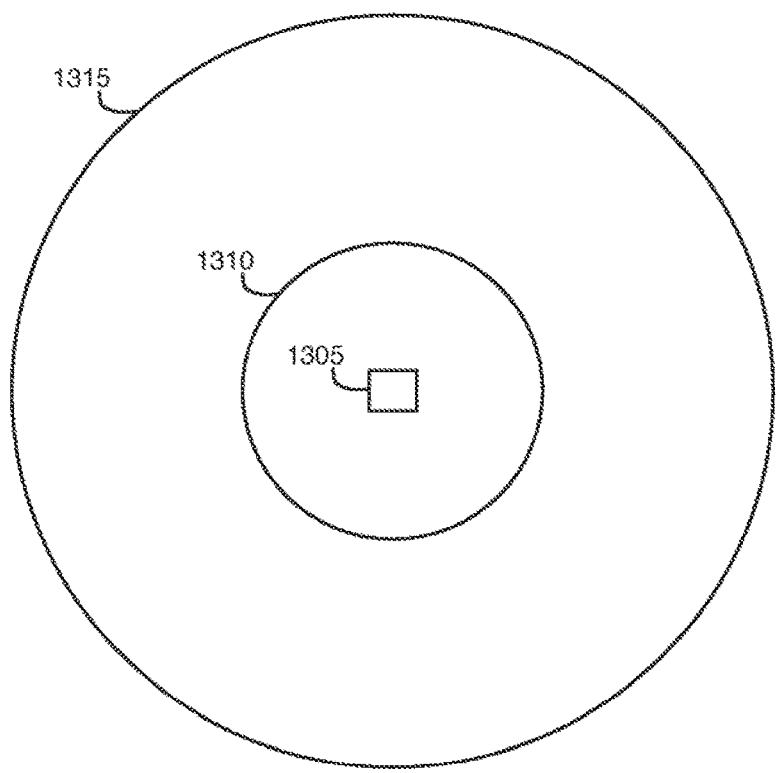
FIG. 13 illustrates an example of primary and secondary threshold distances from a device.
Figure 14:
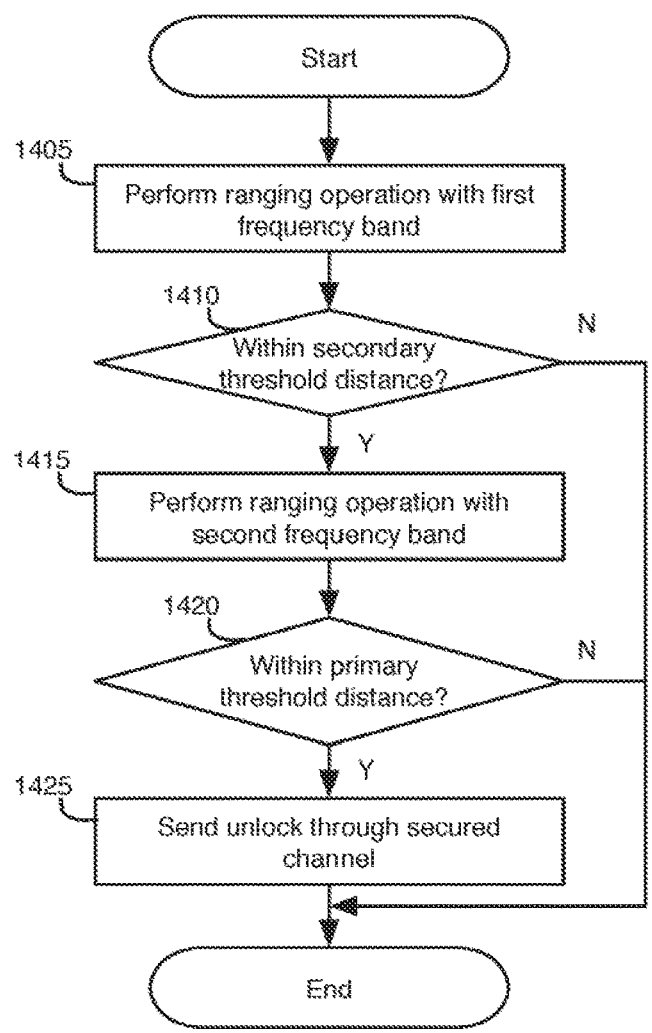
FIG. 14 conceptually illustrates a process for performing a ranging operation with multiple frequency bands.

FIG. 13 illustrates an example of primary and secondary threshold distances from a device. This figure shows a target device 1305 that is to be unlocked. This figure is used to illustrate different distances used for a dual band ranging operation, and is described with reference to FIG. 14. FIG. 14 conceptually illustrates a process for performing a ranging operation with multiple frequency bands.

The process 1400 begins by performing (at 1405) a ranging operation with a first lower-frequency band. The lower-frequency band may be used to determine (at 1410) whether a trusted device is within a secondary threshold distance 1315 (e.g., not the primary threshold distance used determine whether the devices are in the necessary proximity to each other), but may not specifically distinguish where the trusted device is within the secondary threshold distance 1315. The ranging operation of some embodiments is similar to the operations described above, but as it cannot yet determine whether the other device is within the primary threshold distance 1310, the process 1400 does not unlock the device yet.

In some embodiments, the ranging operation performed with the lower-frequency band is similar to the operations described above, but in other embodiments, the lower-frequency band uses a different ranging operation from the higher-frequency band. The preliminary ranging operation of some embodiments is available as a part of a wireless protocol standard. For example, the ranging operation of the lower-frequency band uses a received signal strength indicator (RSSI) to determine that the device is within the secondary threshold distance 1315. RSSI uses signal strength to get an imprecise distance measurement. However, RSSI can be vulnerable to spoofing attacks that amplify legitimate signals to make devices appear to be closer to each other than they truly are. RSSI is less secure than the exchange of nonces, but is also simpler to implement and consumes less power. In some embodiments, a less secure preliminary ranging operation is used to determine whether to perform the more secure secondary ranging operation.

When the process 1400 determines (at 1410) that the other device is not within the first (secondary) threshold distance, the process 1400 ends. When the process 1400 determines (at 1410) that the other device is within the secondary threshold distance, the process 1400 performs (at 1415) a second, more precise and secure, ranging operation (as those described above with reference to FIGS. 9-12) with a second frequency band. The second frequency band of some embodiments is a higher-frequency band that provides the requisite precision to determine (at 1420) whether the devices are within a primary threshold distance. In some embodiments, the secondary and primary threshold distances 1315 and 1310 are determined based on the frequencies of the different band.

When the process 1400 determines (at 1420) that the other device is not within the primary threshold distance, the process 1400 ends. When the process 1400 determines (at 1420) that the other device is within the primary threshold distance, the process 1400 sends an unlock message through a secured channel, as described in the examples above. The process 1400 then ends. In this manner, the devices of some embodiments use secure ranging information to determine whether the trusted and target devices are within a specified range of each other before allowing the trusted device to unlock the target device. An example of the process for actually calculating whether the devices are within a certain proximity is described below.

C. Proximity Calculation

Figure 15:
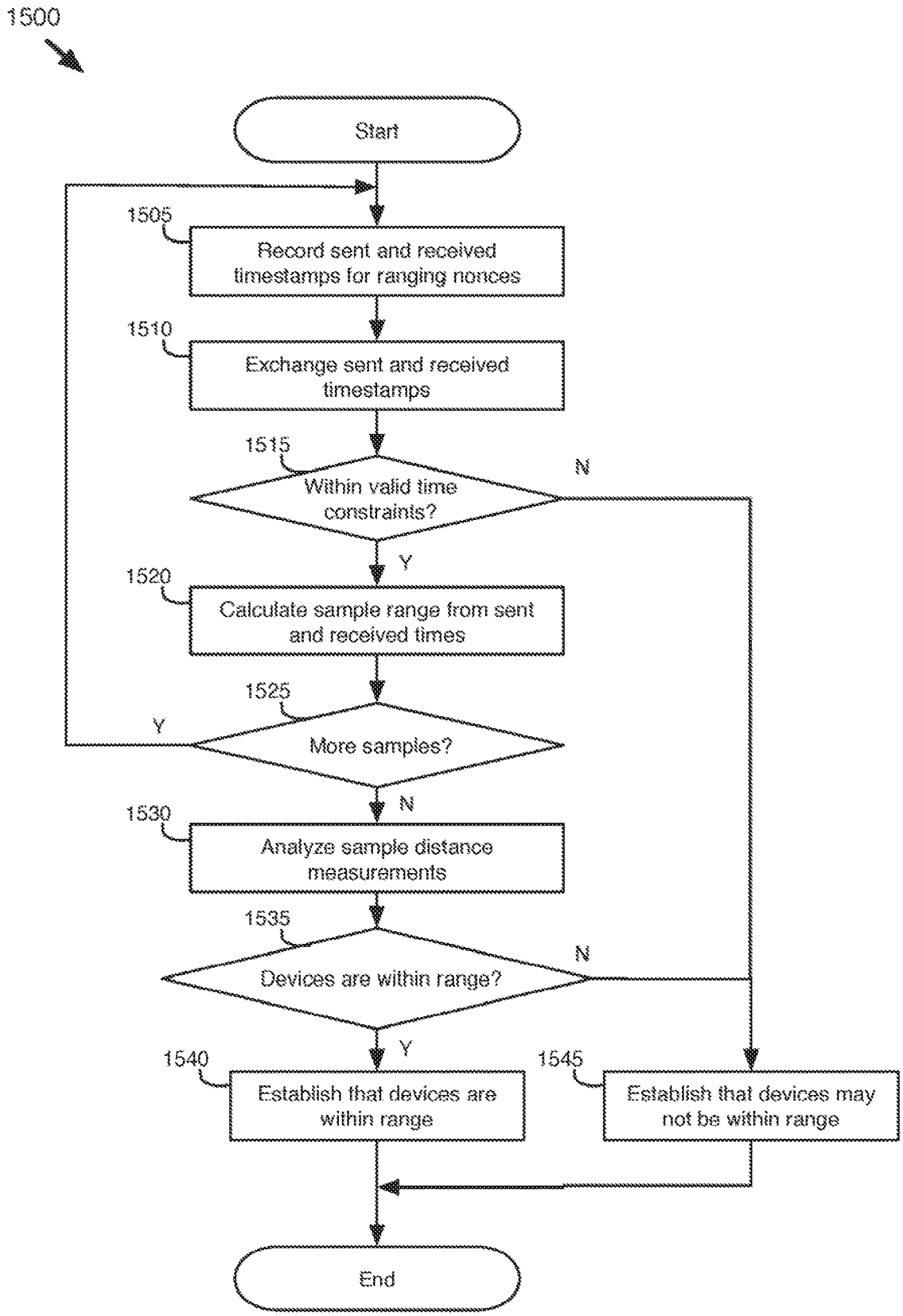
FIG. 15 conceptually illustrates a process for determining whether devices are within a threshold distance of each other, based on a set of message timestamps.

In some embodiments, the trusted and target devices determine whether another device is within a particular range or proximity based on a set of ranging data exchanged between the devices. FIG. 15 conceptually illustrates a process for determining whether devices are within a threshold distance of each other, based on a set of message timestamps (e.g., timestamps exchanged over a derived channel as described above). In some embodiments, the process 1500 is performed by both the target and trusted devices during a security shift process.

The process 1500 records (at 1505) sent and received timestamps for ranging nonces. The process of sending and receiving the nonces, and recording timestamps for the sent and received times, is described above with reference to FIGS. 11 and 12.

The process 1500 exchanges (at 1510) timestamps for when the nonces are sent and received with the other device. For instance, in the examples above, a trusted device sends the time that the first nonce is sent and the time that the second nonce is received, while a target device sends the time that the first nonce is received and the time that the second nonce is sent. In some embodiments, the sent and received timestamps are encrypted over a ranging channel (e.g., using a derived key).

At 1515, the process 1500 determines whether the timestamps fall within a set of time constraints set for the security policy for the ranging operation. For example, in some embodiments, the process 1500 determines (at 1515) whether the time between the receipt of the first nonce and the sending of the second nonce fall within an allowed range of time. By constraining the allowed range of time between the receipt and sending of the nonces, the devices can prevent clock drift attacks that may attempt to take advantage of drift in the system clocks of the devices.

When the process 1500 determines (at 1515) that the timestamps do not fit within the designated time constraints, the process proceeds to step 1545, described below. When the process 1500 determines (at 1515) that the timestamps do fit within the designated time constraints, the process 1500 calculates (at 1520) the time ranges between the sent and received times for the nonces sent between the devices. The calculated ranges indicate the amount of time required for the nonce to travel between the devices. In some embodiments, several sample distance measurements are captured before calculating any of the distance measurements.

At 1525, the process 1500 determines whether to capture more samples. When the process 1500 determines (at 1525) that more samples are needed, the process returns to step 1505 to perform another ranging operation to capture another sample distance measurement. The process 1500 then analyzes (at 1530) the sample distance measurements (or timestamps) from the sample ranging operations to determine whether the devices are within a particular range. The analysis of some embodiments is based on calculations; such as those described with reference to the range calculator 1018 in FIG. 10.

The process 1500 then determines (at 1535) whether the analysis of the sample distance measurements indicate that the other device is within a threshold distance. The threshold distance of some embodiments is identified based on the frequency for the band through which the nonces are communicated. For example, in some embodiments, the threshold distance is a multiple of the minimum resolvable distance.

When the process 1500 determines (at 1535) that the other device is not within the threshold distance, the process 1500 establishes (at 1545) that the devices may not be within the desired range and ends.

When the process 1500 determines (at 1535) that the other device is within the threshold distance, the process 1500 establishes (at 1540) that the devices are within the particular range and the process 1500 then ends.

As described above, once the devices determine that they are within range, they can exchange the authorization information information (e.g., unlock keys, secrets, etc.). In some embodiments, secure ranging is used in conjunction with other aspects of a security protocol in order to securely use a trusted device to modify the security state of a target device.

IV. Electronic System

Many of the above-described features and applications are implemented as software processes that are specified as a set of instructions recorded on a computer readable storage medium (also referred to as a computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 16:
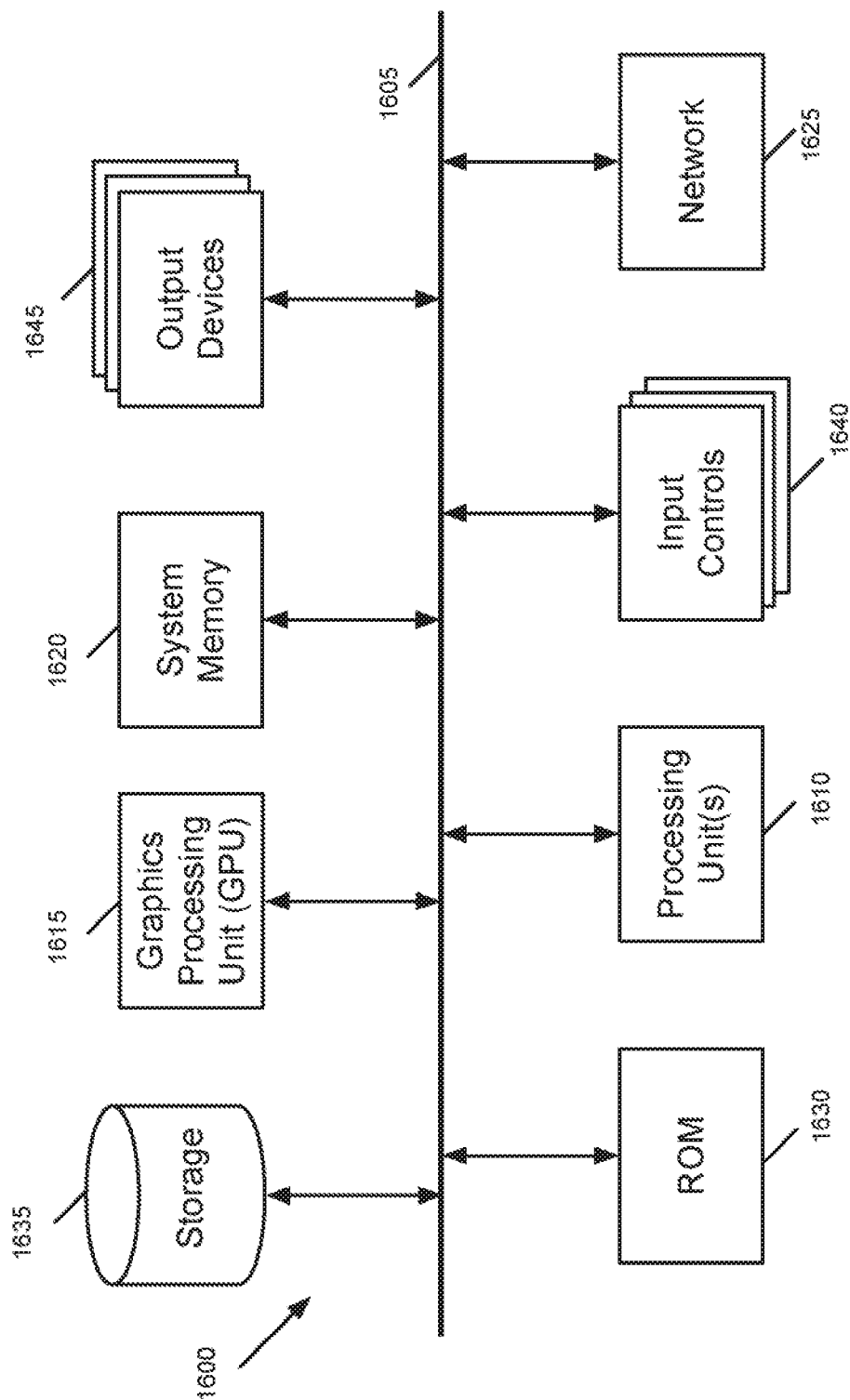
FIG. 16 conceptually illustrates an example of an electronic system with which some embodiments of the invention are implemented.

FIG. 16 conceptually illustrates an example of an electronic system 1600 with which some embodiments of the invention are implemented. The electronic system 1600 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1600 includes a bus 1605, processing unit(s) 1610, a graphics processing unit (GPU) 1615, a system memory 1620, a network 1625, a read-only memory 1630, a permanent storage device 1635, input devices 1640, and output devices 1645.

The bus 1605 collectively represents all system, peripheral, and chipset buses that communicatively connect the numerous internal devices of the electronic system 1600. For instance, the bus 1605 communicatively connects the processing unit(s) 1610 with the read-only memory 1630, the GPU 1615, the system memory 1620, and the permanent storage device 1635.

From these various memory units, the processing unit(s) 1610 retrieves instructions to execute and data to process in order to execute the processes of the invention. The processing unit(s) may be a single processor or a multi-core processor in different embodiments. Some instructions are passed to and executed by the GPU 1615. The GPU 1615 can offload various computations or complement the image processing provided by the processing unit(s) 1610. In some embodiments, such functionality can be provided using CoreImage's kernel shading language.

The read-only-memory (ROM) 1630 stores static data and instructions that are needed by the processing unit(s) 1610 and other modules of the electronic system. The permanent storage device 1635, on the other hand, is a read-and-write memory device. This device is a non-volatile memory unit that stores instructions and data even when the electronic system 1600 is off. Some embodiments of the invention use a mass-storage device (such as a magnetic or optical disk and its corresponding disk drive, integrated flash memory) as the permanent storage device 1635.

Other embodiments use a removable storage device (such as a floppy disk, flash memory device, etc., and its corresponding drive) as the permanent storage device. Like the permanent storage device 1635, the system memory 1620 is a read-and-write memory device. However, unlike storage device 1635, the system memory 1620 is a volatile read-and-write memory, such a random access memory. The system memory 1620 stores some of the instructions and data that the processor needs at runtime. In some embodiments, the invention's processes are stored in the system memory 1620, the permanent storage device 1635, and/or the read-only memory 1630. For example, the various memory units include instructions for processing multimedia clips in accordance with some embodiments. From these various memory units, the processing unit(s) 1610 retrieves instructions to execute and data to process in order to execute the processes of some embodiments.

The bus 1605 also connects to the input and output devices 1640 and 1645. The input devices 1640 enable the user to communicate information and select commands to the electronic system. The input devices 1640 include alphanumeric keyboards and pointing devices (also, called "cursor control devices"), cameras (e.g., webcams), microphones or similar devices for receiving voice commands, etc. The output devices 1645 display images generated by the electronic system or otherwise output data. The output devices 1645 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 16, bus 1605 also couples electronic system 1600 to a network 1625 through a network adapter (not shown). In this manner, the computer can be a part of a network of computers (such as a local area network ("LAN"), a wide area network ("WAN"), or an Intranet), or a network of networks, such as the Internet. Any or all components of electronic system 1600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs. (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, a number of the figures (including FIGS. 1, 3, 4, 7, 11, 12, 14, and 15) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:
1. A method comprising:
   announcing, by a proxy device, an availability of a trusted device;
   in response to the announced availability, receiving, by the proxy device, a first request from a target device; and
   upon receiving the first request from the target device, sending, by the proxy device, a second request to the trusted device, wherein the second request comprises a request for the trusted device to announce its availability directly to the target device from which the first request was received, and the trusted device establishes a communication connection with the target device based on the second request.

2. The method of claim 1, wherein the communication connection between the target device and the trusted device is for exchanging ranging information to determine whether the target device and the trusted device are within a particular range prior to exchanging authorization information to modify a security state of the target device.

3. The method of claim 1, wherein the proxy device announces the availability of the trusted device using a first wireless protocol and the communication connection established between the target device and the trusted device uses a different, second wireless protocol.

4. The method of claim 3, wherein the proxy device maintains a connection with the trusted device using the first wireless protocol.

5. The method of claim 1, wherein the announcing, by the proxy device, the availability of the trusted device comprises broadcasting, by the proxy device, an identifier for the target device.

6. A non-transitory machine readable medium storing a program which when executed by a set of processing units causes the set of processing units to perform operations comprising:
   scanning, by a target device, for availability of a trusted device;
   based on the scan, identifying a particular trusted device;
   sending, by the target device, a first request for the particular trusted device to a proxy device that sends a second request to the particular trusted device;
   receiving, by the target device and directly from the particular trusted device, another availability of the particular trusted device; and establishing, by the target device, a communication connection directly with the particular trusted device responsive to receipt of the other availability.

7. The non-transitory machine readable medium of claim 6, wherein upon receiving the first request, the proxy device instructs the particular trusted device to initiate a broadcast of its availability.

8. The non-transitory machine readable medium of claim 6, wherein the proxy device is in a locked state and the trusted device is in an unlocked state.

9. The non-transitory machine readable medium of claim 6, wherein establishing the communication connection comprises exchanging bootstrap information with the particular trusted device, wherein the bootstrap information identifies a portion of a frequency spectrum for the communication connection.

10. The non-transitory machine readable medium of claim 9, wherein the scanning, sending, and exchanging are performed using a first wireless protocol, wherein the communication connection is established to use a different, second wireless protocol.

11. The non-transitory machine readable medium of claim 6, wherein the program further comprises sets of instructions for:
    receiving input to initiate a change in security state at the target device;
    using the communication connection to perform a set of ranging operations to allow the target device to receive a set of authentication information; and
    using the set of authentication information to change the security state at the target device.

12. The non-transitory machine readable medium of claim 11, wherein the change in security state moves the target device from a locked state to an unlocked state.

13. The non-transitory machine readable medium of claim 11, wherein the target device is allowed to receive the set of authentication information when the trusted device is determined to be within a particular threshold distance based on the set of ranging operations.

14. The non-transitory machine readable medium of claim 11, wherein the trusted device sends the set of authentication information when the target device is determined to be within a particular threshold distance based on the set of ranging operations.

15. A device comprising:
    a memory; and
    at least one processor configured to:
        announce an availability of a trusted device, the trusted device being separate from the device;
        in response to the announced availability, receive a first request from a target device, the target device being separate from the device and the trusted device; and
        upon receipt of the first request from the target device, sending a second request to the trusted device, wherein the second request comprises a request for the trusted device to announce its availability directly to the target device and the trusted device establishes a communication connection with the target device based at least in part on the second request.

16. The device of claim 15, wherein the at least one processor is configured to announce the availability of the trusted device using a first wireless protocol and the communication connection established between the target device and the trusted device uses a different, second wireless protocol.

17. The device of claim 16, wherein the communication connection between the target device and the trusted device is for exchanging ranging information to determine whether the target device and the trusted device are within a particular range prior to exchanging authorization information to modify a security state of the target device.

18. The device of claim 17, wherein the security state of the target device is modified from a locked state to an unlocked state.

19. The device of claim 16, wherein the at least one processor is further configured to maintain a connection with the trusted device using the first wireless protocol.

20. The device of claim 15, wherein the at least one processor is configured to announce the availability of the trusted device by broadcasting an identifier of the trusted device.

* * * * *